US012791760B2

(12) United States Patent
Iazikov et al.

(10) Patent No.: US 12,791,760 B2
(45) Date of Patent: Nov. 10, 2026

(54) PARTIALLY ETCHED REFLECTION-MODIFICATION LAYER

(71) Applicant: II-VI Delaware, Inc., Wilmington, DE (US)

(72) Inventors: Dmitri Iazikov, Eugene, OR (US); Thomas W. Mossberg, Eugene, OR (US); Christoph M. Greiner, Eugene, OR (US); David S. Alavi, Eugene, OR (US)

(73) Assignee: II-VI DELAWARE, INC., Wilmington, DE (US)

( * ) Notice: Subject to any disclaimer, the term of this patent is extended or adjusted under 35 U.S.C. 154(b) by 221 days.

(21) Appl. No.: 18/316,881

(22) Filed: May 12, 2023

(65) Prior Publication Data

US 2023/0333285 A1 Oct. 19, 2023

Related U.S. Application Data

(62) Division of application No. 16/155,902, filed on Oct. 10, 2018, now Pat. No. 11,686,881.

(60) Provisional application No. 62/575,356, filed on Oct. 20, 2017.

(51) Int. Cl.
*G02B 1/11* (2015.01)
*G02B 5/30* (2006.01)

(52) U.S. Cl.
CPC .............. *G02B 1/11* (2013.01); *G02B 5/3083* (2013.01)

(58) Field of Classification Search
CPC ...... G02B 1/11; G02B 1/118; G02B 2207/107
See application file for complete search history.

(56) References Cited

U.S. PATENT DOCUMENTS

| | | | | |
|---|---|---|---|---|
| 6,359,735 | B1 | 3/2002 | Gombert et al. | |
| 6,958,207 | B1 | 10/2005 | Khusnatdinov et al. | |
| 7,359,597 | B1 | 4/2008 | Iazikov et al. | |
| 7,508,585 | B2 * | 3/2009 | Maeno | G02B 5/1866 359/571 |
| 8,009,355 | B2 * | 8/2011 | Nakai | G02B 1/118 359/485.05 |
| 8,165,436 | B2 | 4/2012 | Mossberg et al. | |
| 8,559,110 | B2 * | 10/2013 | Tanikawa | G02B 1/11 359/569 |

(Continued)

OTHER PUBLICATIONS

Chattopadhyay, Surojit, et al. "Anti-reflecting and photonic nanostructures." Materials Science and Engineering: R: Reports 69.1-3 (2010): 1-35. (Year: 2010).*

(Continued)

*Primary Examiner* — Christopher Stanford
(74) *Attorney, Agent, or Firm* — TraskBritt

(57) ABSTRACT

An optical element includes a transmissive layer arranged on a substrate and made up of discrete volumes of first and second optical media. The layer is between the substrate and another optical medium. The volumes are arranged so that, averaged over a wavelength's distance of an incident optical signal, the effective reflectivities of the two surfaces of the transmissive layer and the effective double-pass phase delay through the transmissive layer are substantially constant across the transmissive layer. The reflectivities and phase delay result in net power reflectivity that differs from that of the substrate in direct contact with the other optical medium. The transmissive layer can be arranged as an anti-reflection layer.

9 Claims, 12 Drawing Sheets

(56) References Cited

U.S. PATENT DOCUMENTS

| | | | |
|---|---|---|---|
| 8,989,537 | B2 | 3/2015 | Mossberg et al. |
| 9,618,664 | B2 * | 4/2017 | Mossberg ............ G02B 5/1866 |
| 10,520,648 | B2 | 12/2019 | Takahashi |
| 10,539,723 | B2 * | 1/2020 | Iazikov .................... G02B 3/08 |
| 2002/0135869 | A1 | 9/2002 | Banish et al. |
| 2005/0094277 | A1 | 5/2005 | Khusnatdinov et al. |
| 2007/0159698 | A1 | 7/2007 | Taguchi et al. |
| 2009/0116790 | A1 | 5/2009 | Mossberg et al. |
| 2010/0110552 | A1 | 5/2010 | Nakazawa et al. |
| 2014/0327966 | A1 | 11/2014 | Tani |
| 2015/0062713 | A1 | 3/2015 | Hart et al. |

OTHER PUBLICATIONS

"N/A, Corning HPFS Fused Silica, retrieved 2022 (Year: 2022)".
"N/A, Magnesium Fluoride Windows, retrieved 2022, thorlabs.com (Year: 2022)".
"N/A, Titanium dioxide, retrieved 2022, nist.gov (Year: 2022)".
Williams K.R., et al., "Etch Rates for Micromachining Processing-Part II," Journal of Microelectromechanical Systems, Dec. 2003, vol. 12, No. 6, pp. 762-778, 18 Pages.

* cited by examiner

PARTIALLY ETCHED REFLECTION-MODIFICATION LAYER

BENEFIT CLAIMS TO RELATED APPLICATIONS

This application is a divisional of U.S. patent application Ser. No. 16/155,902, filed Oct. 10, 2018, which claims benefit of U.S. Provisional Application No. 62/575,356 filed Oct. 20, 2017 said provisional application being hereby incorporated by reference as if fully set forth herein.

FIELD OF THE INVENTION

The field of the present invention relates to reflection-modification layers for optical elements, including anti-reflection layers. In particular, partially etched reflection-modification layers, and methods for making and using the same, are disclosed herein.

SUMMARY

An inventive optical element comprises a transmissive layer supported by a substantially solid substrate. The transmissive layer has a substantially uniform thickness D and comprises a first optical medium that is solid and a second optical medium. A first surface of the transmissive layer faces a solid substrate, which supports the transmissive layer, and a second surface of the transmissive layer is positioned against a third optical medium; the transmissive layer is interposed between the substrate and the third optical medium. The first optical medium, the second optical medium, the third optical medium, and the substrate are substantially transparent over an operational wavelength range that includes a design vacuum wavelength $\lambda_0$, and are characterized by respective bulk refractive indices $n_1$, $n_2$, $n_3$, and $n_{sub}$ that can vary with wavelength. Over at least the operational wavelength range, $n_1 \neq n_2$. The first and second optical media are arranged within the transmissive layer as a contiguous multitude of discrete volumes, and each discrete volume (i) extends longitudinally from the first surface to the second surface, and (ii) comprises either the first optical medium or the second optical medium, but not both.

Each discrete volume of the first optical medium is less than a distance $d_1$ in transverse extent in one or both transverse dimensions and is separated from at least one other discrete volume of the first optical medium by a transverse distance less than $d_2$ through an intervening discrete volume of the second optical medium, or each discrete volume of the second optical medium is less than a distance $d_2$ in transverse extent in one or both transverse dimensions and is separated from at least one other discrete volume of the second optical medium by a transverse distance less than $d_1$ through an intervening discrete volume of the first optical medium; in each case, $d_1+d_2<2\lambda_0/(n_{sub}+n_3)$. In some instances, both of those size limitations apply, simultaneously over a common area of the transmissive layer, or singly over distinct areas of the transmissive layer. In some instances, $d_1+d_2<\lambda_0/(n_{sub}+n_3)$.

For an optical signal within the operational wavelength range and incident on the transmissive layer, the optical element exhibits (i) field amplitude reflectivity $r_1$ from the first surface, (ii) phase delay $\Delta\varphi$ for single-pass propagation through the transmissive layer, and (iii) field amplitude reflectivity $r_2$ from the second surface. The discrete volumes of the multitude are variously sized and distributed on the transmissive layer so that $r_1$, $r_2$, and $\Delta\varphi$ are each substantially constant, when averaged with a sampling area about equal in transverse extent to $\lambda_0$ in both transverse dimensions, as a function of two-dimensional transverse position along the transmissive layer. The substantially constant values of $r_1$, $\Delta\varphi$, and $r_2$ result in net power reflectivity of the transmissive layer that differs from power reflectivity that would be exhibited by an interface between the substrate and the third optical medium without the transmissive layer therebetween. In many instances, $n_{sub} \neq n_3$, and the substantially constant values of $r_1$, $\Delta\varphi$, and $r_2$ result in net power reflectivity of the transmissive layer that is less than power reflectivity that would be exhibited by an interface between the substrate and the third optical medium without the transmissive layer therebetween, i.e., the transmissive layers acts as an anti-reflection layer.

A method for making the inventive optical element spatially selectively processing a layer comprising the first optical medium to replace, in selected volumes of the layer, the first optical medium with the second optical medium, thereby forming the transmissive layer of the optical element. A method for making the inventive optical element can further include a calibration process or an iterative fabrication process. A method employing the inventive optical element comprises directing an optical signal onto the transmissive layer of the optical element and transmitting through the transmissive layer at least a portion of the incident optical signal.

Objects and advantages pertaining to optical elements with reflection-modification layers may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the disclosed or claimed subject matter, nor is it intended to be used as an aid in determining the scope of the disclosed or claimed subject matter.

Figure 1:
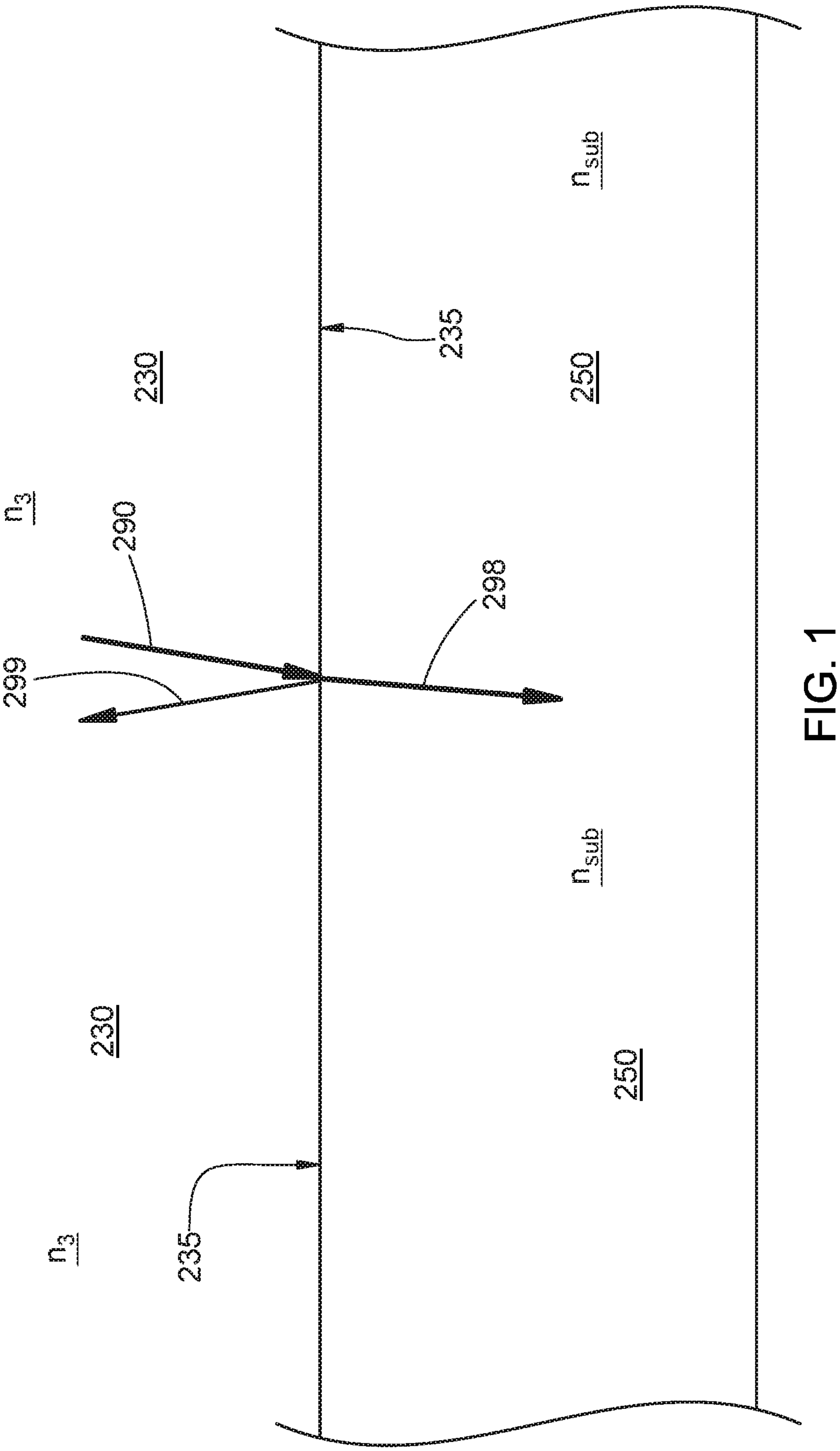
FIG. 1 PRIOR ART
FIG. 1 illustrates schematically conventional transmission and reflection of an optical signal at an interface between different optical media.

The embodiments depicted are shown only schematically: all features may not be shown in full detail or in proper proportion, certain features or structures may be exaggerated relative to others for clarity, and the drawings should not be regarded as being to scale. Transmissive layers depicted as having a handful or dozens of distinct discrete volumes typically can have regions with thousands or millions of discrete volumes per square millimeter; the number of discrete volumes is reduced in the drawings only for clarity. Transmissive layers depicted as having discrete volumes all of the same size often can instead have discrete volumes of multiple different sizes; the discrete volumes are all drawn the same size only for simplicity. Height, length, or width of each volume often can be exaggerated relative to, e.g., the thickness of an underlying substrate. Transmissive layers depicted as being flat can instead be curved; the transmissive layers are drawn flat only for simplicity. The embodiments shown are only examples: they should not be construed as limiting the scope of the present disclosure or appended claims.

DETAILED DESCRIPTION OF EMBODIMENTS

A common problem in the field of optics is the reduction or elimination of unwanted reflections at interfaces between optical media having different refractive indices. Such boundaries are ubiquitous as surfaces of transmissive optical elements of numerous types, e.g., windows, lenses, waveplates, polarizers, filters, gratings, and so forth. For a transmissive optical element, any unwanted reflection represents optical loss from the transmitted signal introduced by that element; such loss is typically undesirable. The reflected portion of the signal also can cause problems unrelated to the optical loss, e.g., as a source of undesirable: stray light; optical feedback; noise, background, or interference in optical signal detection; secondary or ghost images; or eye hazards. It is therefore desirable to reduce or eliminate unwanted reflections.

FIG. 1 illustrates schematically a general arrangement in which an optical signal 290 is incident on an interface or boundary 235 between transparent optical media 230 and 250. Typically at least one of the optical media (optical medium 250 in FIG. 1; also referred to as the substrate 250) is a solid material so that the boundary 235 retains a constant shape and position. In some instances both of the optical media 230 and 250 are solid materials, while in other instances the second optical medium (optical medium 230 in FIG. 1) is vacuum, a gaseous medium, a liquid medium, or other ambient medium. The media 230 and 250 are characterized by bulk refractive indices $n_3(\lambda)$ and $n_{sub}(\lambda)$, respectively, that often vary with the wavelength k of the incident optical signal 290. For clarity, the explicit wavelength dependence of the refractive indices is omitted from the drawings and much of the remainder of the description, but remains implicitly present. At the boundary 235, one portion of the incident optical signal 290 is transmitted (and refracted) as the transmitted optical signal 298, while another portion is reflected as the reflected optical signal 299. The directions of the refracted optical signal 298 and the reflected optical signal 299 are given by the laws of refraction and reflection, respectively. The drawings show non-normal incidence of an optical signal 290 incident on the boundary 235 after propagating through the optical medium 230, but the following descriptions apply equally to arrangements wherein the incident optical signal 290 propagates at normal incidence or is incident on the boundary 235 after propagating through the substrate 250.

The relative fractions of the incident optical signal that are transmitted and reflected are given by the Fresnel equations and depend on the refractive indices $n_3$ and $n_{sub}$, the angle of incidence of the incident optical signal 290, and (for non-normal incidence) the polarization of the incident optical signal 290. Some specific examples include (at normal incidence in the visible or near IR wavelength range): about 3.4% power reflectivity at an air/silica interface ($n_3 \approx 1$; $n_{sub} \approx 1.45$); about 12.1% power reflectivity at a silica/silicon interface ($n_3 \approx 1.45$; $n_{sub} \approx 3$); and about 25% reflectivity at an air/silicon interface ($n_3 \approx 1$; $n_{sub} \approx 3$). It is assumed in much of the present disclosure that $n_3 < n_{sub}$; however, the teachings of the present disclosure apply similarly when $n_3 > n_{sub}$. (Note: if $n_3 \approx n_{sub}$, then there is no reflection from the interface to reduce or eliminate.) Various formulae appearing in the present disclosure apply to normal incidence, but can be generalized for non-normal incidence and to account for polarization. Those generalizations are well-known and are omitted from the present disclosure in the interest of clarity; nevertheless, the present disclosure and appended claims shall be construed as encompassing both normal and non-normal incidence of an incident optical signal on an optical element.

Figure 2:
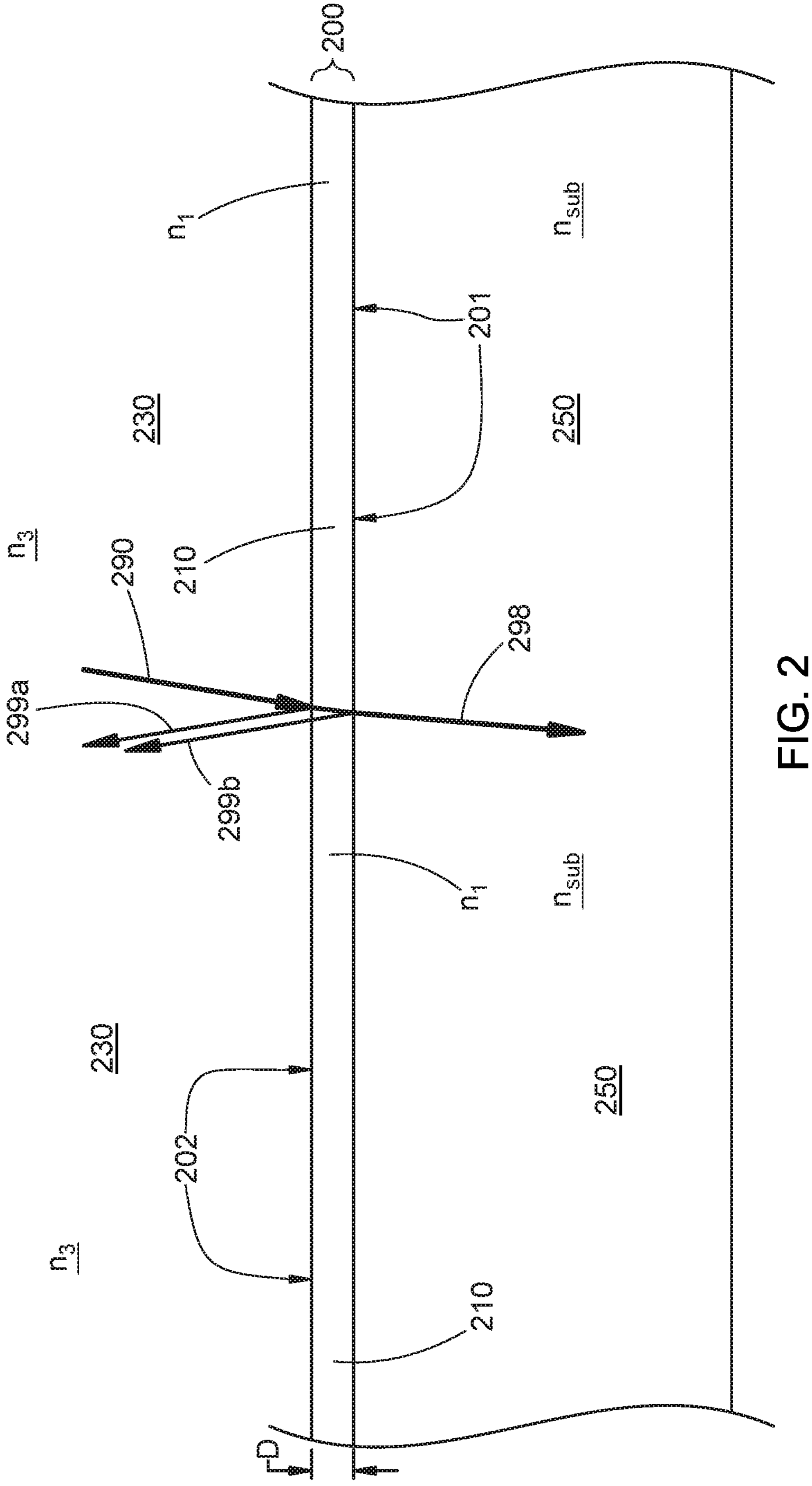
FIG. 2 PRIOR ART
FIG. 2 illustrates schematically transmission and reflection of an optical signal from a conventional $\lambda/4$ anti-reflection coating at an interface between different optical media.

A conventional arrangement for reducing or eliminating reflection is illustrated schematically in FIG. 2. A single thin-film layer 200 is positioned between the optical media 230 and 250. The layer 200 comprises a solid optical medium 210 characterized by bulk refractive index $n_1(\lambda)$. The incident optical signal 290 is incident on the interface 202 between the optical medium 230 and the layer 200 and then on the interface 201 between the optical medium 250 and the layer 200. The refracted optical signal 298 is transmitted by the interfaces 201 and 202. A first reflected optical signal 299*a* is reflected at the interface 202, and a second reflected optical signal 299*b* is reflected from the interface 201. The thickness D of the layer 200 is chosen so that the reflected signals 299*a* and 299*b* have a relative phase shift about equal to an odd multiple of $\pi$, at a design wavelength $\lambda_0$, so as to destructively interfere. In some examples, at normal incidence, and if $n_1$ is between $n_3$ and $n_{sub}$, (i.e., if either $n_3 < n_1 < n_{sub}$ or $n_3 > n_1 > n_{sub}$), then $D = \lambda_0/(4n_1)$ yields a relative phase shift of n for maximal destructive interference between the reflected optical signals 299*a* and 299*b* at the design wavelength $\lambda_0$ (and therefore maximal reduction of reflective loss). Such a layer is referred to as a quarter-wave layer or a $\lambda/4$ layer. For a given $\lambda/4$ layer 200, less than maximal destructive interference of the reflections 299*a* and 299*b* occurs at normal incidence at wavelengths that differ from ko, but a useful reduction in reflection occurs over a significant wavelength range around $\lambda_0$ (e.g., $\lambda_0 \pm 25\%$ or more in some examples). Similarly, for a given $\lambda/4$ layer 200, less than maximal destructive interference occurs at ko at non-normal incidence, but a useful reduction in reflection occurs over a significant range of incidence angles (e.g., at incidence angles up to 45° or more in some examples). Another way of describing the situation is that, for a given layer thickness D, altering the angle of incidence shifts the wavelength at which maximal destructive interference occurs. Layer thickness that are an odd multiple of the $\lambda/4$ thickness can also be employed, but with correspondingly reduced useful ranges of wavelength and incidence angle, as is known in the art.

In some other examples, at normal incidence, and if $n_1$ is greater than both $n_3$ and $n_{sub}$, then $D = \lambda_0/(2n_1)$ yields a relative phase shift of 37C for maximal destructive interference between the reflected optical signals 299*a* and 299*b* at the design wavelength $\lambda_0$ (and therefore maximal reduction of reflective loss).

The relative field amplitudes of the reflected signals 299*a* and 299*b* determine the maximal extent to which those signals can destructively interfere. Ideally, the reflected amplitudes would be equal, so that maximal destructive interference would in fact result in complete elimination of any net reflection from the interfaces 201 and 202 of the layer 200. At normal incidence on a $\lambda/4$ layer, the reflected amplitudes are about equal (neglecting multiple reflections within the layer 200 or depletion of the incident signal 290 by the first reflected signal 299*a*) when $n_1 = (n_3 \cdot n_{sub})^{1/2}$, i.e., when $n_1$ is the geometric mean of $n_3$ and $n_{sub}$. If a material with the correct refractive index can be found and employed, then net reflectivity from the interfaces 201 and 202 of the layer 200 can be exactly nulled with a λ/4 layer, and reflective loss from transmission between the optical media 230 and 250 can be substantially eliminated. More generally, if a suitable material can be found and employed, a thickness D can be selected that substantially eliminates reflective loss for a given combination of wavelength, incidence angle, and (if non-normal incidence) polarization.

In practice, it is often not possible to find or practicable to employ a suitable optical medium 210 that has the correct refractive index $n_1$ for a given pair of optical media 230 and 250 with corresponding refractive indices $n_3$ and $n_{sub}$. For example, for an air/glass interface ($n_3 \approx 1$; $n_{sub} \approx 1.5$), the required value for equal reflected field amplitudes at normal incidence is $n_1 \approx 1.22$, but there is no suitable material available with that refractive index that can be deposited as a thin film on glass. However, even if exact cancellation of the reflected field amplitudes cannot be achieved, reflective loss can still be reduced to a useful extent using a λ/4 layer of a material with index $n_1$ between the indices $n_3$ and $n_{sub}$, even if it is not the correct value. In the air/glass example, power reflectivity of the interface without any intermediate layer 200 is about 4%. A λ/4 layer of magnesium fluoride ($MgF_2$; $n_1 \approx 1.38$ in the visible wavelength range) reduces the net power reflectivity to less than 1.3%. In another example, an uncoated air/silicon interface ($n_3 \approx 1$; $n_{sub} \approx 3$) exhibits power reflectivity of about 25%. A λ/4 layer with an index $n_1 \approx 1.73$ would be required for complete elimination of reflective loss. However, a λ/4 layer of silica ($n_1 \approx 1.45$) or silicon nitride ($n_1 \approx 2$) reduces that net reflective power loss to less than 2%.

In examples disclosed herein (FIGS. 3-12) of inventive reflection-modification layers on an optical element, the conventional λ/4 layer 200 comprising a single optical medium 210 is replaced with a transmissive layer 100 that comprises two optical media 10 and 20 with respective bulk refractive indices $n_1(\lambda)$ and $n_2(\lambda)$. The transmissive layer 100 has a substantially uniform thickness D, a first surface 101 that faces a solid substrate 50 that supports the transmissive layer, and a second surface 102 positioned against another optical medium 30. The transmissive layer 100 is therefore interposed between the substrate 50 and the optical medium 30. In some examples (e.g., FIGS. 3-6) the first surface 101 of the transmissive layer is positioned against the substrate 50; in some other examples (e.g., FIGS. 7-12) an additional layer separates the surface 101 from the substrate 50. Note that for each of the surfaces 101 and 102, in some examples a surface (or portions thereof) can include a distinct physical interface or boundary between differing structures or materials, while in other examples the surface or portions thereof can include a virtual boundary between different regions of a single structure or material. Examples of the first type include, e.g., the entire surface 101 in FIGS. 3, 4, and 9-12, portions of the surface 101 in FIGS. 5-8, the entire surface 102 in FIGS. 3, 5, 7, 9, and 11, or portions of the surface 102 in FIGS. 4, 6, 8, 10, and 12. Examples of the second type include, e.g., portions of the surface 101 in FIGS. 5-8, or portions of the surface 102 in FIGS. 4, 6, 8, 10, and 12.

The optical medium 30 can comprise a solid, liquid, or gaseous material, or vacuum. The optical medium 10 comprises a solid material (possibly, but not necessarily, the same solid material as the substrate 50); the optical medium 20 can comprise a solid, liquid, or gaseous material, or vacuum (possibly, but not necessarily, the same material or absence of material as the optical medium 30). The substrate 50 and the optical media 10, 20, and 30 are substantially transparent over an operational wavelength range that includes a design vacuum wavelength $\lambda_0$, and are characterized by respective (often, but not necessarily, wavelength-dependent) bulk refractive indices $n_{sub}(\lambda)$, $n_1(\lambda)$, $n_2(\lambda)$, and $n_3(\lambda)$. For clarity, the explicit wavelength dependence of the refractive indices is omitted from the drawings, the claims, and much of the remainder of the description, but remains implicitly present for those materials having a refractive index that varies with wavelength. Over at least the operational wavelength range, $n_1 \neq n_2$; if $n_1 = n_2$, the transmissive layer 100 would behave just as does the single-medium layer 200 described above. In many examples of practical interest, $n_{sub} \neq n_3$, and the transmissive layer 100 is arranged so as to act as an anti-reflection layer. As noted above, if $n_{sub} = n_3$, there is no reflective loss to mitigate.

For purposes of the present disclosure and appended claims, "longitudinal" denotes a direction locally perpendicular to the surfaces 101 and 102 (and also can be referred to as "vertical"), and "transverse" denotes the two dimensions locally parallel to the surfaces 101 and 102 (and also can be referred to as "horizontal"). Note: although the surfaces 101 and 102 are shown as being flat in the drawings, the anti-reflection layer 100 can be applied to or formed on a substrate 50 that has a surface that is flat or curved, and both flat and curved surfaces shall fall within the scope of the present disclosure or appended claims. The terms "longitudinal," "transverse," "vertical," and "horizontal" are defined locally along the surface and can vary in absolute direction among different positions along a curved surface.

The optical media 10 and 20 are arranged within the transmissive layer 100 as a contiguous multitude of discrete volumes 103. Each discrete volume 103 (*i*) extends longitudinally from the surface 101 to the surface 102, and (ii) comprises either the optical medium 10 or the optical medium 20, but not both. In the disclosed inventive arrangements, the wave nature of the optical signals is exploited to spatially average the refractive indices of the optical media 10 and 20. That result is achieved by making the discrete volumes 103 sufficiently small relative to the design wavelength $\lambda_0$ so that an incident optical signal 90 effectively "samples" both of the optical media 10 and 20 of multiple discrete volumes 103 simultaneously. A desired averaged, effective refractive index for the transmissive layer 100, within a range between $n_1$ and $n_2$, can be achieved by selecting suitable area fractions $f_1$ and $f_2$ of the transmissive layer 100 occupied by the optical media 10 and 20, respectively (discussed further below). Note that the area fractions $f_1$ and $f_2$ that result in a given averaged, effective refractive index might vary depending on the specific geometry of the discrete volumes 103.

An incident optical signal 90, within the operational wavelength range, is incident on the transmissive layer 100. The incident optical signal 90 is shown in the drawings propagating through the optical medium 30 at non-normal incidence; the present disclosure applies equally to inventive arrangements wherein the incident optical signal 90 propagates at normal incidence, or is incident on the transmissive layer 100 after propagating through the substrate 50. The surface 102 reflects a portion of the incident optical signal 90 as the reflected optical signal 99*a*; the surface 101 reflects another portion of the incident optical signal 90 as the reflected optical signal 99*b*. The remainder of the incident optical signal propagates away from the transmissive layer 100 as the refracted, transmitted optical signal 98. The field amplitude reflectivity of the surface 101 is $r_1$, the field amplitude reflectivity of the surface 102 is $r_2$, and the phase delay for single-pass propagation of an optical signal through the layer 100 is $\Delta\varphi$. The discrete volumes 103 are variously sized and distributed on the transmissive layer 100 so that $r_1$, $\Delta\varphi$, and $r_2$ are each substantially constant, when averaged with a sampling area about equal in transverse extent to $\lambda_0$ in both transverse dimensions, as corresponding functions of two-dimensional transverse position along the transmissive layer. In other words, the incident optical signal 90 effectively "samples" the discrete volumes 103 over areas comparable in size to the wavelength $\lambda_0$, washing out the short-range spatial variation of refractive index among the discrete volumes 103. The resulting field amplitude reflectivities ($r_1$ and $r_2$) and phase delay ($\Delta\varphi$) "look" to the incident optical signal 90 as if they are constant across the transmissive layer 100. Those substantially constant values of $r_1$, $\Delta\varphi$, and $r_2$ result in net power reflectivity of the transmissive layer 100 that differs from power reflectivity that would be exhibited by an interface between the substrate 50 and the optical medium 30 without the transmissive layer 100 therebetween. In many examples of practical interest, $n_{sub} \neq n_3$, and the transmissive layer 100 is arranged so that net power reflectivity of the transmissive layer 100 is less than power reflectivity that would be exhibited by an interface between the substrate 50 and the third optical medium 30 without the transmissive layer 100 therebetween. In other words, in such examples the transmissive layer 100 acts as an anti-reflection layer.

Figure 3:
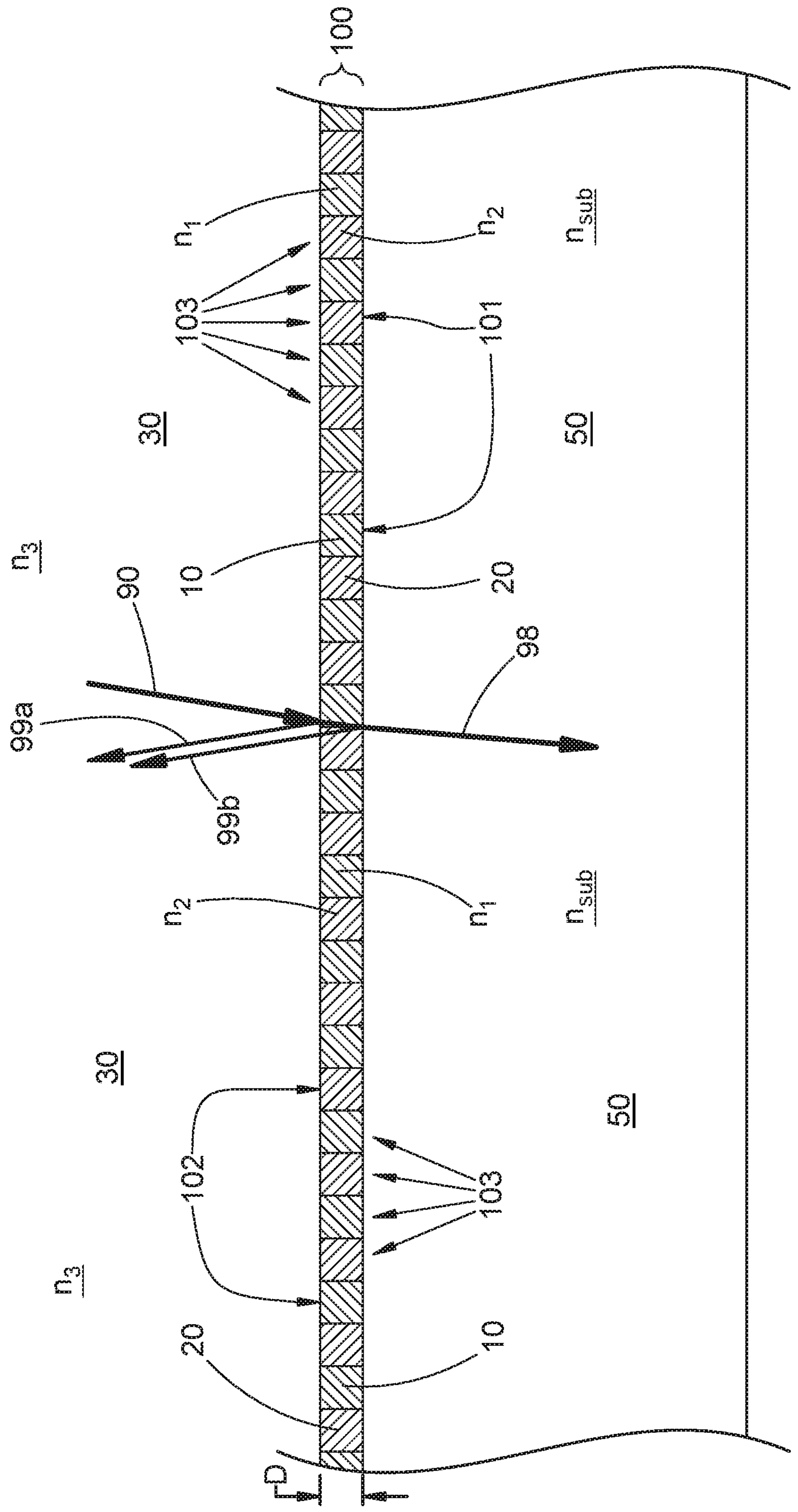
FIGS. 3-12 illustrate schematically transmission and reflection of an optical signal from various examples of inventive reflection-modification layers at an interface between optical media.

In the example of FIG. 3, four different materials are employed for the substrate 50 and the optical media 10/20/30. For purposes of the present disclosure and appended claims, materials having similar chemical compositions shall nevertheless be considered "different materials" if their refractive indices differ due to, e.g., different stoichiometry, different crystalline structure, or different crystalline orientation. Materials of differing composition might have the same refractive index, but materials having different refractive indices are not considered the same material even if their chemical compositions are quite similar. In some examples arranged as in FIG. 3, the four different materials can have can have four different corresponding refractive indices; other examples arranged as in FIG. 3 can have $n_1 = n_{sub}$, $n_2 = n_3$, or both (still with four different materials). The transmissive layer 100 in the example of FIG. 3 comprises a surface relief structure formed in any suitable way through a surface layer of the solid optical medium 10 on the substrate 50; the optical medium 20 substantially fills recessed regions of the surface relief structure. The surface relief structure can be imparted onto a layer of the optical medium 10 in any suitable way (the term "etched" in the title represents a common example), e.g., by spatially selective etching, deposition, or lithography of the optical medium 10, or by molding, stamping, or embossing the optical medium 10, or by replication of a master, or by other suitable spatially selective material processing. In some examples, the optical medium 10 exhibits an etch rate that is significantly greater than an etch rate of the substrate 50, so that the etch process slows or stops upon etching through the optical medium 10 to reach the surface of the substrate 50. In such examples the substrate 50 acts as an etch stop, and the accuracy of the thickness D of the transmissive layer 100 is determined by initial deposition of a uniform layer of the optical medium 10 on the substrate 50 (which often can be controlled quite precisely), instead of depending on accurate timing of an etch process (which often has a rate that can vary, at different times or at different positions during a single performance of the etch process, or among multiple performances of the etch process).

When the optical media 20 and 30 are different materials, then the optical medium 20 typically would be a solid material; if the optical medium 20 were liquid or gaseous material or vacuum, typically optical medium 30 would be the same liquid or gaseous material or vacuum (discussed further below). When the optical media 20 and 30 are different materials, the optical medium 30 can be vacuum, a liquid material, a gaseous material, or a solid material. Using solid materials for both optical media 10 and 20 can complicate fabrication of the transmissive layer 100 (e.g., by necessitating use of difficult or complex material processing techniques such a chemical mechanical polishing or planarization aka CMP). On the other hand, such use of solid materials for both optical media 10 and 20 allows selection of different values for $n_2$ and $n_3$ for designing the transmissive layer 100, or can advantageously yield a transmissive layer 100 that is more mechanically robust or resistant to dirt or contaminants. Which of those considerations takes precedence can vary among different use environments or performance requirements for an optical element with the transmissive layer 100.

Figure 5:
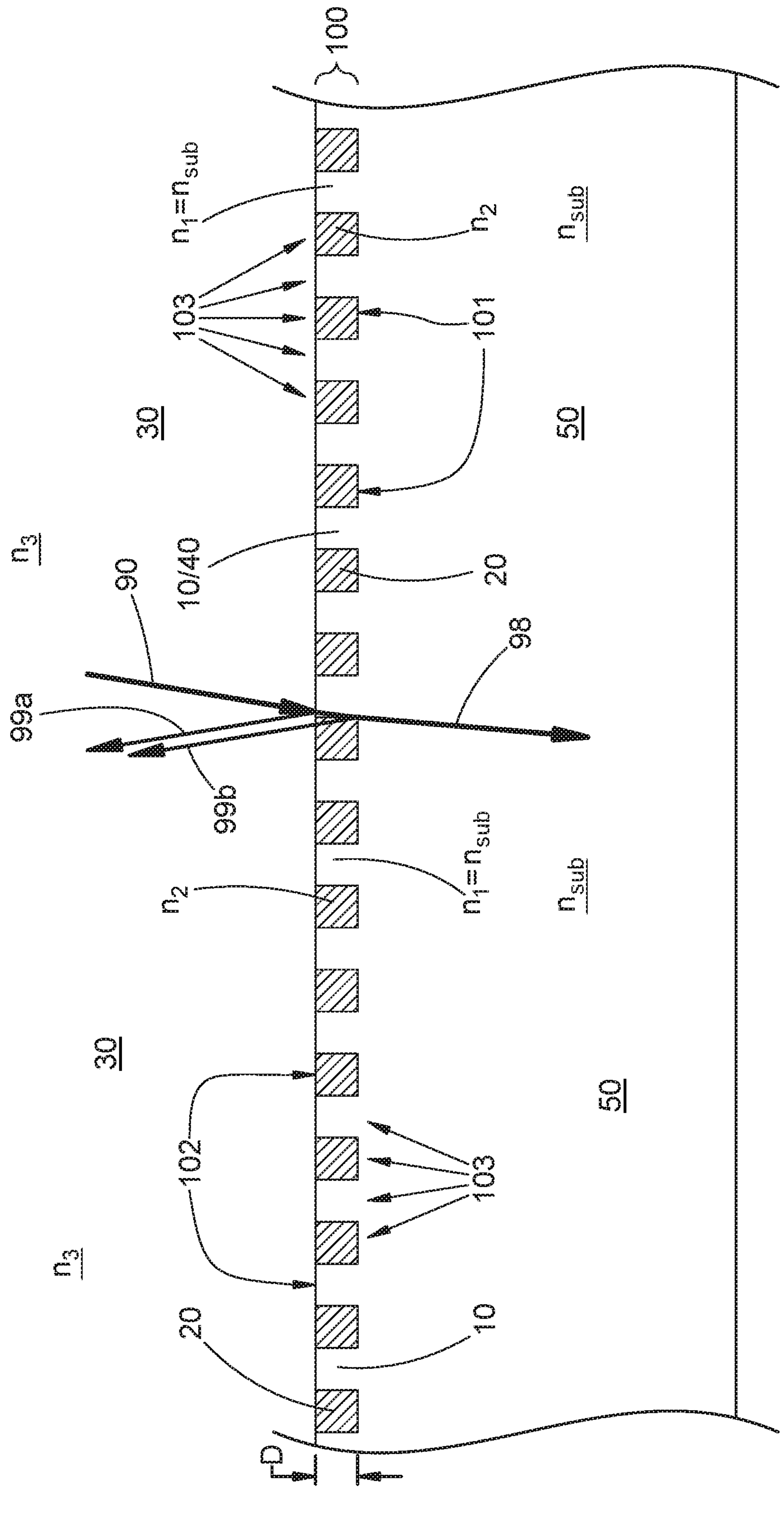
Figure 6:
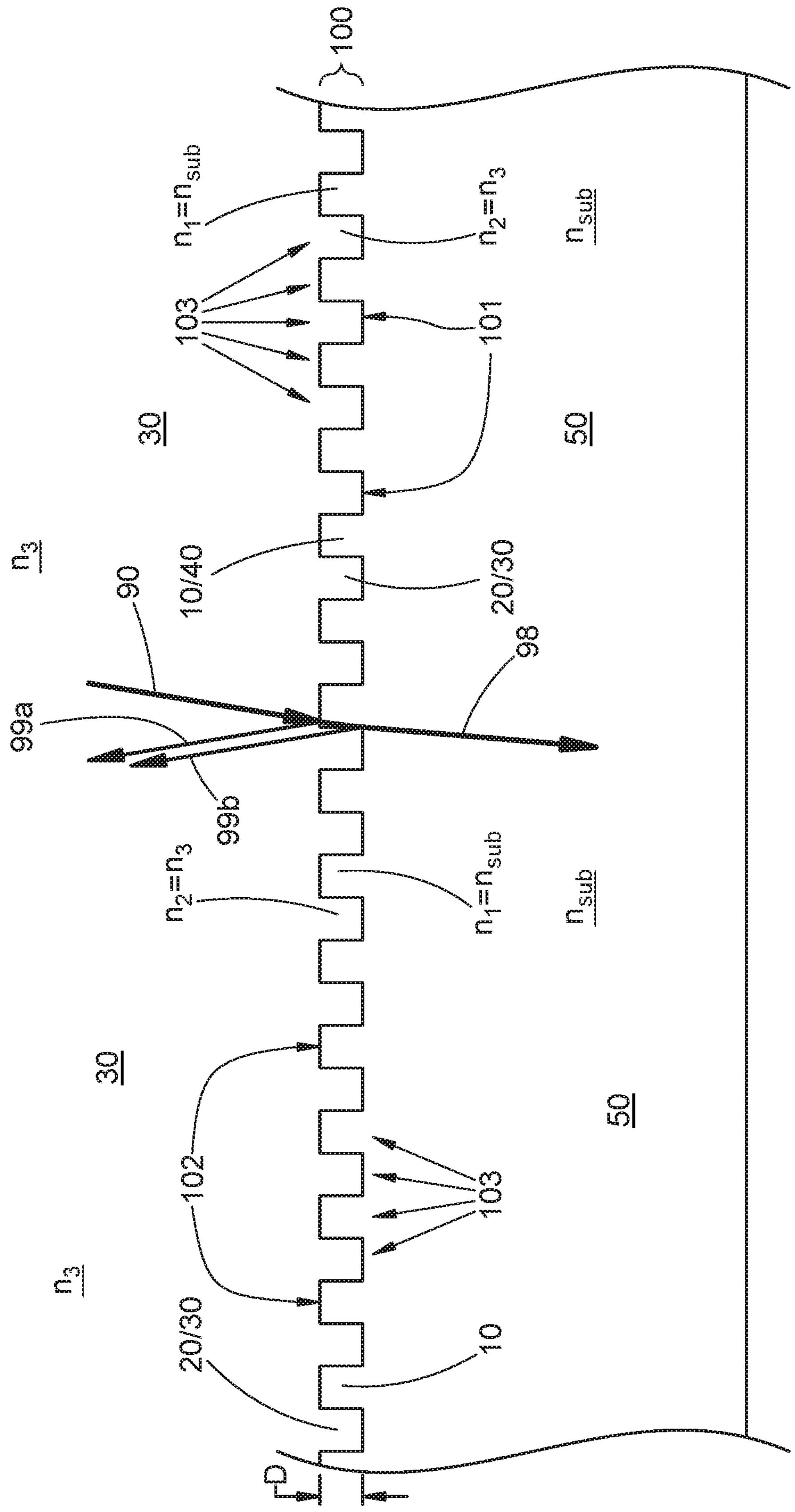

In the examples of FIGS. 5 and 6, the substrate 50 and the optical medium 10 are the same solid material; the discrete volumes 103 of the optical medium 10 of the transmissive layer 100 form a surface relief structure on a surface of the substrate 50. The optical medium 20 substantially fills recessed regions of the surface relief structure. The surface relief structure can be imparted onto the surface of the substrate 50 in any suitable way, including those described above. In such examples wherein an etch or deposition process is employed, duration of that process must be sufficiently accurate to yield a thickness D of the transmissive layer 100 with a desired degree of accuracy or precision.

Figure 4:
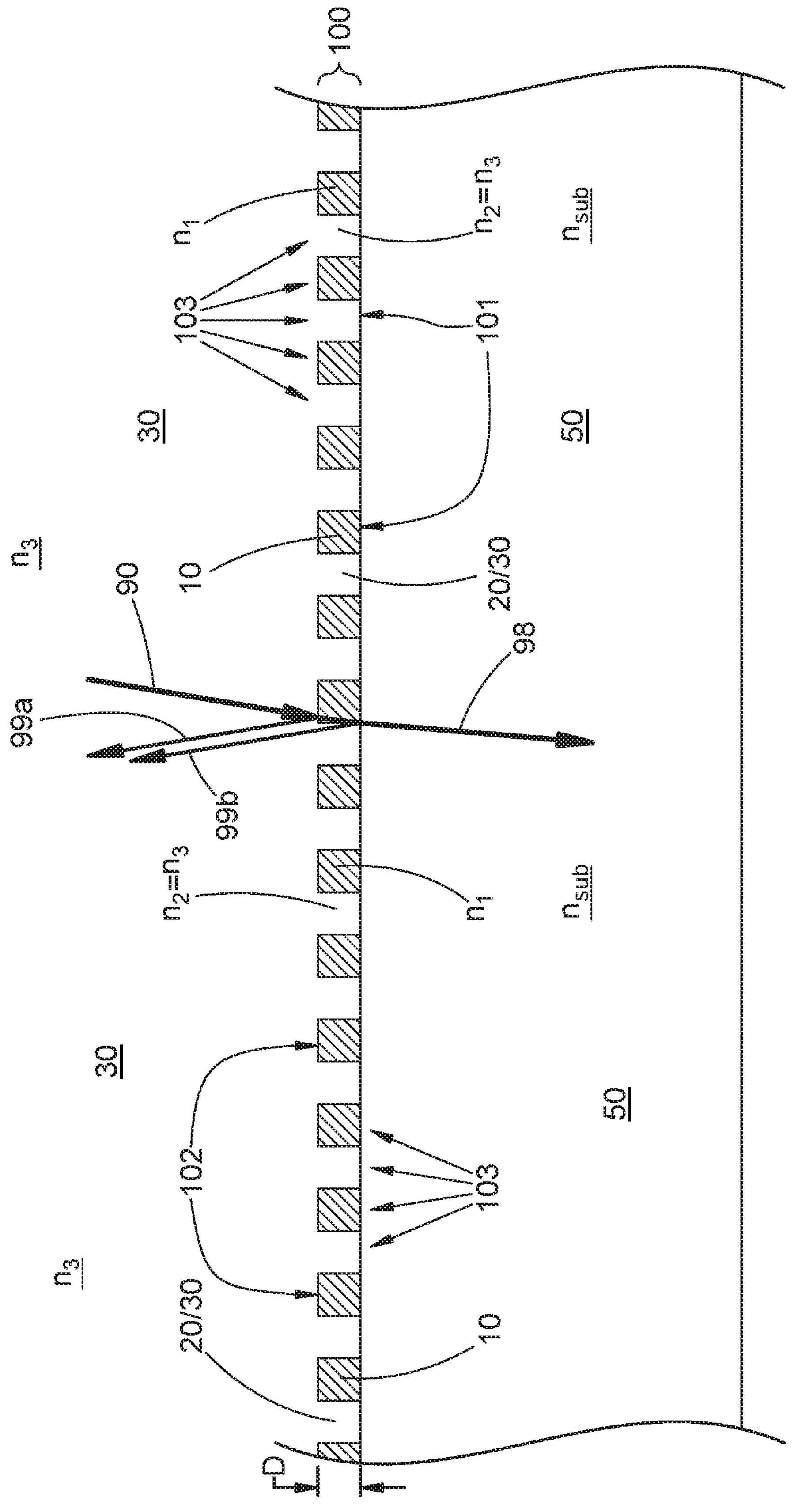

In the examples of FIGS. 4 and 6, the optical media 20 and 30 are the same material. In some of those examples, the optical media 20 and 30 are the same solid material. Such examples can be formed by any suitable deposition process that enables the material to enter spaces between discrete volumes 103 of the optical medium 10. In some examples vapor deposition of any suitable type can be employed; in some other examples, a liquid polymer precursor can be applied over the substrate 50 and optical medium 10, filling spaces between the discrete volumes 103 of the optical medium 10 before curing into a solid polymer material forming the solid optical media 20 and 30. In many other examples, however, the optical media 20 and 30 are the same gaseous or liquid material or are both vacuum. After imparting the surface relief structure onto the substrate 50 or through the optical medium 10 in any suitable way (including those described above), the substrate 50 with the discrete volumes 103 of the solid optical medium 10 is simply placed in vacuum or immersed in a liquid or gaseous optical medium, thereby forming the optical media 20 (within discrete volumes 103 of the transmissive layer 100) and 30 (against the surface 102 of the transmissive layer 100). While such arrangements are simpler to fabricate, the discrete volumes 103 of the solid optical medium 10 remain exposed to physical damage, dirt, or contamination. That may not be a significant consideration of the optical element is deployed in a sealed or otherwise protective environment, e.g., in a hermetically sealed housing of an optoelectronic device.

An example of arranged according to FIG. 6 (i.e., the substrate 50 and the optical medium 10 are the same material, and the optical media 20 and 30 are the same medium) in which the optical media 20 and 30 are vacuum or a liquid or gaseous material, can be among the simplest to fabricate, requiring only the formation of the surface relief structure on the surface of the substrate 50 followed by immersion in the optical medium 20/30.

Examples of suitable materials for the substrate 50 include, but are not limited to, one or more of: doped or undoped silicon; one or more doped or undoped Ill-V semiconductors; doped or undoped silicon oxide, nitride, or oxynitride (e.g., $SiO_2$, $SiO_x$, $Si_3N_4$, $SiN_x$, or $SiO_xN_y$; amorphous $SiO_2$ is commonly referred to as silica or fused silica); one or more doped or undoped metal oxides, nitrides, or oxynitrides; one or more optical glasses (e.g., various heavily doped silicas, or mixtures of silica and one or more metal oxides); or one or more doped or undoped polymers. Examples of suitable materials for the optical medium 10 include, but are not limited to, one or more of: doped or undoped silicon; one or more doped or undoped III-V semiconductors; doped or undoped silicon oxide, nitride, or oxynitride; one or more doped or undoped metal oxides, nitrides, or oxynitrides; one or more optical glasses; one or more doped or undoped polymers, or indium tin oxide. Indium tin oxide can form substantially transparent, electrically conductive films, and in some examples can be advantageously employed to provide both an anti-reflection layer and electrical functionality for the optical element (e.g., heating, illumination, display control, and so forth). Examples of suitable materials for the optical medium 20 include, but are not limited to, one or more of: vacuum; one or more of air, nitrogen, noble gas, or other inert gas; one or more optical liquids; doped or undoped silicon; one or more doped or undoped Ill-V semiconductors; doped or undoped silicon oxide, nitride, or oxynitride; one or more doped or undoped metal oxides, nitrides, or oxynitrides; one or more optical glasses; or one or more doped or undoped polymers. Examples of suitable materials for the optical medium 30 include, but are not limited to, one or more of: vacuum; one or more of air, nitrogen, noble gas, or other inert gas; one or more optical liquids; doped or undoped silicon; one or more doped or undoped Ill-V semiconductors; doped or undoped silicon oxide, nitride, or oxynitride; one or more doped or undoped metal oxides, nitrides, or oxynitrides; one or more optical glasses; or one or more doped or undoped polymers. Solid materials listed can be amorphous, crystalline, or polycrystalline, as needed, suitable, available, or desired.

Net power reflectivity of the transmissive layer 100 is about equal to $|r_1+r_2\cdot\cos(2\cdot\Delta\varphi)|^2$. Note that the phase delay Op is multiplied by 2 in this expression to account for double-pass propagation, i.e., (i) propagation of the incident optical signal 90 through the transmissive layer 100, plus (ii) propagation of the reflected optical signal 99*b* back through the transmissive layer 100. Note also that the phase-shifted amplitude reflectivities are added (with their relative phase shift) before squaring to obtain the power reflectivity, so as to account for interference between the reflected signals 99*a* and 99*b*. For given values of the effective, average amplitude reflectivities $r_1$ and $r_2$, a phase shift of $\Delta\varphi\approx\pi/2$ yields maximal destructive interference after double-pass transmission if $r_1$ and $r_2$ have the same sign (i.e., if $r_1\cdot r_2>0$). If $r_1$ and $r_2$ have the opposite sign (i.e., if $r_1\cdot r_2<0$), then a phase shift of $\Delta\varphi\approx\pi$ yields maximal destructive interference after double-pass transmission. For a given arrangement of the discrete volumes 103 within the transmissive layer 100, a thickness D can be chosen that yields the desired phase shift. The advantage of the inventive arrangements of the discrete volumes 103 within the transmissive layer 100 is the ability to alter those arrangements to achieve the desirable condition of $r_1\approx r_2$ or $r_1\approx -r_2$ (as before, neglecting multiple reflections within the layer 100 or depletion of the incident signal 90 by the first reflected signal 99*a*). With suitable optical media 10 and 20 suitably arranged within the transmissive layer 100, net power reflectivity can be reduced to less than about one half, less than about one fourth, or less than about one tenth, or even less, of the power reflectivity that would be exhibited by an interface between the substrate 50 and the optical medium 30 without the transmissive layer 100 present between them. In some instances, reflectivity can be substantially eliminated.

Various specific arrangements of the discrete volumes 103 are described further below. For a given combination of optical media 10/20/30 and substrate 50, and a specific geometry of the discrete volumes 103, Maxwell's equations can provide an exact calculation of the averaged, effective values of $r_1$, $\Delta\varphi$, and $r_2$ that result from a given arrangement of the discrete volumes 103, or to determine an arrangement that results in a desired reduced level of reflection at a desired design wavelength $\lambda_0$. A useful approximation or starting point, however, makes use of the corresponding fractional areas $f_1$ and $f_2$ occupied by each of the optical media 10 and 20. The fractional area of the transmissive layer 100 discrete volumes 103 of the optical medium 10 is $f_1$, and the fractional area of the transmissive layer 100 discrete volumes 103 of the optical medium 20 is $f_2$; together those fractions occupy substantially fill the entire area of the transmissive layer 100, i.e., $f_1+f_2\approx1$ (neglecting lateral boundaries between the volumes 103 that are not vertical; non-vertical boundaries can result in $f_1+f_2$ being slightly less than one; in many examples assuming the boundaries are vertical is a sufficiently good approximation). Using the Fresnel equations for normal incidence, the field amplitude reflectivity $r_1$ can be approximated as $$r_1\approx f_1\cdot[(n_3-n_1)/(n_3+n_1)]+f_2[(n_3-n_2)/(n_3+n_2)],$$

and the field amplitude reflectivity $r_2$ can be approximated by $$r_2\approx f_1\cdot[(n_1-n_{sub})/(n_1+n_{sub})]+f_2\cdot[(n_2-n_{sub})/(n_2+n_{sub})].$$

Note that $r_1$ and $r_2$ each can be positive or negative, depending on the refractive indices $n_1$, $n_2$, $n_3$, and $n_{sub}$ and the area fractions $f_1$ and $f_2$. Setting the reflectivities $r_1$ and $r_2$ equal to one another, the equations can be solved for $f_1$ and $f_2$. With the fractional areas $f_1$ and $f_2$ in hand, the single-pass phase shift Op can be approximated by $\Delta\varphi\approx[f_1\cdot n_1+f_2\cdot n_2]\cdot2\pi D/\lambda_0$. Setting that last expression equal to $\pi/2$ (to yield a double-pass phase shift of $\pi$; assuming $r_1\cdot r_2>0$) yields $D\approx\lambda_0/[4\cdot(f_1\cdot n_1+f_2\cdot n_2)]$. That latter equation is equivalent to the quarter-wave condition for the conventional example of FIG. 2, with index of the single medium 210 of the layer 200 replaced by the averaged index of the two media 10 and 20 of the transmissive layer 100. Note that the equations given above and used below for $r_1$, $r_2$, and $\Delta\varphi$ are only approximations or starting points. For a given combination of materials, arrangements of the volumes 103, and fabrication methods (which can in part determine deviation from the idealized geometry shown in the drawings), the actual values for $f_1$, $f_2$, and D that yield the desired degree of destructive interference (for anti-reflection functionality) can differ from those obtained from the above equations.

In examples such as that shown in FIG. 6, in which the substrate 50 and the optical medium 10 are the same material ($n_1=n_{sub}$) and the optical media 20 and 30 are the same material ($n_2=n_3$), the above equations yield $f_1\approx f_2\approx0.5$, and $D\approx\lambda_0/[2\cdot(n_1+n_2)]$. This makes intuitive sense, because the reflected optical signals 99*a* and 99*b* both arise from interfaces of the same two materials and therefore have the same local field amplitude reflectivity. This example simplifies fabrication of the transmissive layer 100 on the substrate 50, because only one solid material is present and needs to be processed to form those discrete volumes 103 of the optical medium 10 on the substrate 50. This arrangement becomes even easier to fabricate in those instances wherein the optical media 20/30 is vacuum or an ambient liquid or gaseous medium. In a specific example within this category with $f_1 \approx f_2 \approx 0.5$, in which the substrate 50 and the optical medium 10 are both silicon ($n_1 = n_{sub} \approx 3$) and the optical media 20 and 30 are both air ($n_2 n_3 = 1$), the equations above yield $D \approx \lambda_0/8$. In another specific example within this category with $f_1 \approx f_2 = 0.5$, in which the substrate 50 and the optical medium 10 are both undoped silica ($n_1 = n_{sub} \approx 1.45$) and the optical media 20 and 30 are both air ($n_2 = n_3 = 1$), the equations above yield $D \approx \lambda_0/4.9$.

In a specific example of a different type (arranged as in FIG. 5), in which the substrate 50 and the optical medium 10 are both silicon ($n_1 = n_{sub} \approx 3$), the optical medium 20 is undoped silica ($n_2 \approx 1.45$), and the optical medium 30 is air ($n_3 \approx 1$), the above equations yield $f_1 \approx 0.25$, $f_2 \approx 0.75$, and $D \approx \lambda_0/7.36$. In another specific example (arranged as in FIG. 4), in which the substrate 50 is silicon ($n_{sub} \approx 3$), the optical medium 10 is silicon nitride ($n_1 = 2$), and both optical media 20 and 30 are air ($n_2 = n_3 = 1$), the above equations yield $f_1 \approx 0.79$, $f_2 \approx 0.21$, and $D \approx \lambda_0/7.16$. In another specific example (arranged as in FIG. 4), in which the substrate 50 is undoped silica ($n_{sub} \approx 1.45$), the optical medium 10 is silicon nitride ($n_1 = 2$), and both optical media 20 and 30 are air ($n_2 = n_3 = 1$), the above equations yield $f_1 \approx 0.27$, $f_2 \approx 0.73$, and $D \approx \lambda_0/5.09$. In another specific example (arranged as in FIG. 4), in which the substrate 50 is undoped silica ($n_{sub} \approx 1.45$), the optical medium 10 is indium tin oxide ($n_1 = 1.7$), and both optical media 20 and 30 are air ($n_2 = n_3 = 1$), the above equations yield $f_1 \approx 0.32$, $f_2 \approx 0.68$, and $D \approx \lambda_0/5.02$. In another specific example (arranged as in FIG. 3), in which the substrate 50 is silicon ($n_{sub} \approx 3$), the optical medium 10 is silicon nitride ($n_1 = 2$), the optical medium 20 is undoped silica ($n_2 \approx 1.45$), and the optical medium 30 is air ($n_3 \approx 1$), the above equations yield $f_1 \approx 0.55$, $f_2 \approx 0.45$, and $D \approx \lambda_0/7.02$. Myriad other suitable combinations of substrate 50 and optical media 10/20/30 can be employed within the scope of the present disclosure or appended claims.

To achieve the desired spatial averaging of the refractive indices $n_1$ and $n_2$, the discrete volumes 103 must be suitably sized (i.e., suitably small) and suitably arranged (i.e., with sufficiently small separation between volumes 103 of the same optical medium). Also, one objective of any anti-reflection coating or layer is to reduce loss from the transmitted optical signal 98. One possible source of undesirable optical loss arising from the inventive transmissive layer 100 is optical loss by diffraction from the multitude of discrete volumes 103. If care is not taken, the discrete volumes can act as a diffractive structure and divert some of the incident optical signal 90 away from transmission as the optical signal 98. Accordingly, in some inventive examples, each discrete volume 103 of the optical medium 10 is less than a distance $d_1$ in transverse extent in one or both transverse dimensions, and is separated from at least one other discrete volume 103 of the optical medium 10 by a transverse distance less than $d_2$ through an intervening discrete volume 103 of the optical medium 20, and $d_1 + d_2 < 2\lambda_0/(n_{sub} + n_3)$; that size limitations can prevent undesirable non-zero-order diffraction for some angles of incidence. In some inventive examples $d_1 + d_2 < \lambda_0/(n_{sub} + n_3)$, or even smaller, guaranteeing that no non-zero-order diffraction can occur for any angle of incidence. In some inventive examples, each discrete volume 103 of the optical medium 20 is less than a distance $d_2$ in transverse extent in one or both transverse dimensions, and is separated from at least one other discrete volume 103 of the optical medium 20 by a transverse distance less than $d_1$ through an intervening discrete volume 103 of the optical medium 10, and $d_1 + d_2 < 2\lambda_0/(n_{sub} + n_3)$; that size limitations can prevent undesirable non-zero-order diffraction for some angles of incidence. In some inventive examples $d_1 + d_2 < \lambda_0/(n_{sub} + n_3)$, or even smaller, guaranteeing that no non-zero-order diffraction can occur for any angle of incidence. In some inventive examples, both of the above size limitations apply, simultaneously over one or more common areas of the transmissive layer, or singly over two or more distinct areas of the transmissive layer. The described use of sub-wavelength volumes 103 enables the desired simultaneous "sampling" of the optical media 10 and 20 by the incident optical signal 90.

The discrete volumes 103 can be arranged within the transmissive layer 100 in myriad ways. Note that the drawings are all edge-on cross-sections of the transmissive layer 100, and can represent an arrangement of the discrete volumes 103 that varies only along the single transverse dimension shown in the drawings, or along both transverse dimensions (including the one into the plane of the drawings). In some examples, discrete volumes 103 are arranged as a multitude of linear or curvilinear ridges of the optical medium 10 and intervening grooves filled with the optical medium 20; the combined width of each ridge and an adjacent groove less than about $2\lambda_0/(n_{sub} + n_3)$ (preventing undesirable non-zero-order diffraction for some angles of incidence), or less than about $\lambda_0/(n_{sub} + n_3)$ (guaranteeing no non-zero-order diffraction by the ridges and grooves at any angle of incidence). In such examples, the duty cycle of the ridges and grooves is equivalent to the fractional areas $f_1$ and $f_2$. In some examples, each discrete volume 103 of the optical medium 10 is less than about $\lambda_0/(n_{sub} + n_3)$ in both transverse dimensions, or less than about $\lambda_0/(2(n_{sub} + n_3))$ in both transverse dimensions. In some examples, each discrete volume of the optical medium 20 is less than about $\lambda_0/(n_{sub} + n_3)$ in both transverse dimensions, or less than about $\lambda_0/(2(n_{sub} + n_3))$ in both transverse dimensions. In some examples, both of those two-dimensional size limitations apply.

In some examples, the discrete volumes 103 are spatially distributed across the transmissive layer 100 in an uncorrelated, irregular, random, or pseudo-random arrangement; such arrangements can reduce the likelihood of non-zero-order diffraction of optical signals, but may instead increase undesirable optical loss due to non-coherent optical scattering. In some examples, the discrete volumes 103 are arranged as either (i) a multitude of simply connected volumes of the optical medium 10 surrounded by the optical medium 20 (i.e., a "islands of medium 10 in a sea of medium 20"), or (ii) a multitude of simply connected volumes of the optical medium 20 surrounded by the optical medium 10 (i.e., a "islands of medium 20 in a sea of medium 10"). In some examples, each of those arrangements can be present in distinct areas of the transmissive layer 100. In some examples, the discrete volumes 103 are arranged along the transmissive layer 100 with a periodicity Ao between about $\lambda_0/(50(n_{sub} + n_3))$ and about $2\lambda_0/(n_{sub} + n_3)$, or between about $\lambda_0/(10(n_{sub} + n_3))$ and about $\lambda_0/(n_{sub} + n_3)$ (i.e., the discrete volumes 103 are sub-wavelength features of the transmissive layer 100). The periodicity can assume any suitable form, e.g., a triangular, square, rectangular, hexagonal, or other grid pattern. A so-called "unit cell" can be repeated across the grid pattern, with the unit cell having one or more discrete volumes 103 (or portions thereof) of the optical media 10 and 20. Periodicity $\Lambda_0$ less than about $2\lambda_0/(n_{sub} + n_3)$ can prevent undesirable non-zero-order diffraction for some angles of incidence; periodicity Ao less than about $\lambda_0/(n_{sub}+n_3)$ can prevent non-zero-order diffraction for all angles of incidence.

The lateral boundaries between adjacent volumes 103 of the optical media 10 and 20 (which can be straight or curved in the vertical dimension when viewed along a horizontal dimension) are substantially perpendicular to the first and second surfaces 101 and 102 (i.e., are substantially vertical), or are within about 5°, 10°, 20°, 30°, or 45° of perpendicular to the first and second surfaces 101 and 102 (i.e., within about 5°, 10°, 20°, 30°, or 45° of vertical). Spatially selective material processing techniques act with a directional preference can be employed to yield such geometries (e.g., a directional dry etch process, or a wet etch process that etches preferentially along certain crystallographic planes).

As noted above, the reduction by the transmissive layer 100 of net power reflectivity from the interface between the substrate 50 and the optical medium 30 arise from destructive interference between the two reflected signals 99*a* and 99*b* reflected from the surfaces 102 and 101, respectively. Typically the behavior is similar to that of a conventional λ/4 layer, and can be contrasted to other arrangements for reducing unwanted reflections at a material interface. In some conventional examples, instead of a sharp boundary between two optical media, a so-called index gradient can be formed. Over a relatively short distance the refractive index gradually changes from that of one optical medium to that of the other. The incident optical signal never encounters an index boundary, and reflection is suppressed. In so-called moth-eye structures, sub-wavelength structural elements in the form of tapered cones or pyramids are arranged across the surface of a first medium and extend into the second medium. The incident optical signal effectively "samples" multiple structures, which "appear" to the incident optical signal as an index gradient (which is about equal to the index of the first medium at the bases of the cones/pyramids and about equal to the index of the second medium at the apices of the cones/pyramids. In nether of those examples (index gradient or moth-eye) is there destructive interference between two reflected optical signals arising from two distinct surfaces of a transmissive layer. In addition, simple binary etch processes (e.g., in which a given area can be etched or not, photo-exposed or not, doped or not, etc.) can be employed to produce the inventive transmissive layers 100 disclosed or claimed herein, in contrast to the complex fabrication methods required to form the tapering features of a moth-eye structure.

The example of FIGS. 9-12 are analogous to those of FIGS. 3-6, respectively, except for the addition of another solid optical medium 40 in the form of a continuous layer of thickness T between the substrate 50 and the surface 101 of the transmissive layer 100. The optical medium 40 is substantially transparent over the operational wavelength range, and is characterized by a bulk refractive index $n_4(\lambda)$ (typically, but not necessarily, wavelength-dependent; explicit wavelength dependence omitted hereafter). The field amplitude reflectivity $r_1$ results from a superposition of reflections from both surfaces of the layer of the optical medium 40, which typically also adds a small phase shift to the reflected optical signal 99*b*. An exact solution can be obtained by fully solving Maxwell's equations. Much of the descriptions given above for the examples of FIGS. 3-6 apply equally to FIGS. 9-12, respectively.

The layer of the optical medium 40 typically is employed as an etch stop layer, to aid in precise or accurate fabrication of the transmissive layer 100 on the substrate 50. The optical medium 40 typically exhibits an etch rate smaller than that of the optical medium 10. An etch process slows or stops upon etching through the optical medium 10 to reach the surface of the optical medium 40 acting as an etch stop layer. The accuracy of the thickness D of the discrete volumes 103 of the transmissive layer 100 is determined by initial deposition of a uniform layer of the optical medium 10 over the optical medium 40 (which often can be controlled quite precisely), instead of depending on accurate timing of an etch process (which often has a rate that can vary, at different times or at different positions during a single performance of the etch process, or among multiple performances of the etch process). Examples of suitable materials for the optical medium 40 can include any of those disclosed above for the substrate 50 or optical medium 10, provided that a given combination of optical media 10 and 40 exhibit the desired etch rate difference. In one specific example, titanium dioxide or hafnium dioxide (the optical medium 40) can be a thin layer below a layer of silicon nitride (the optical medium 10). The etch process stops at the layer of titanium dioxide or hafnium dioxide after etching through the silicon nitride.

Figure 7:
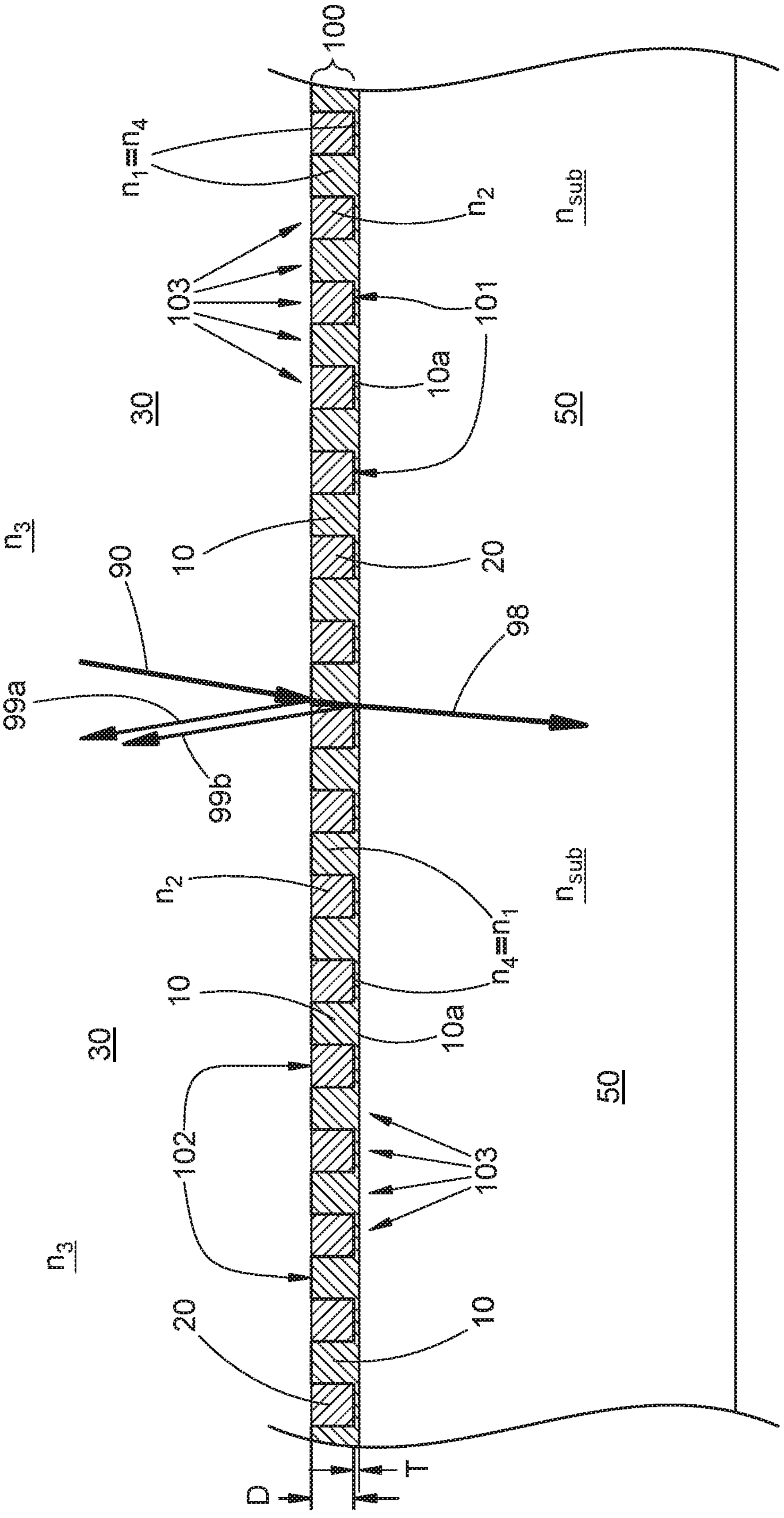
Figure 8:
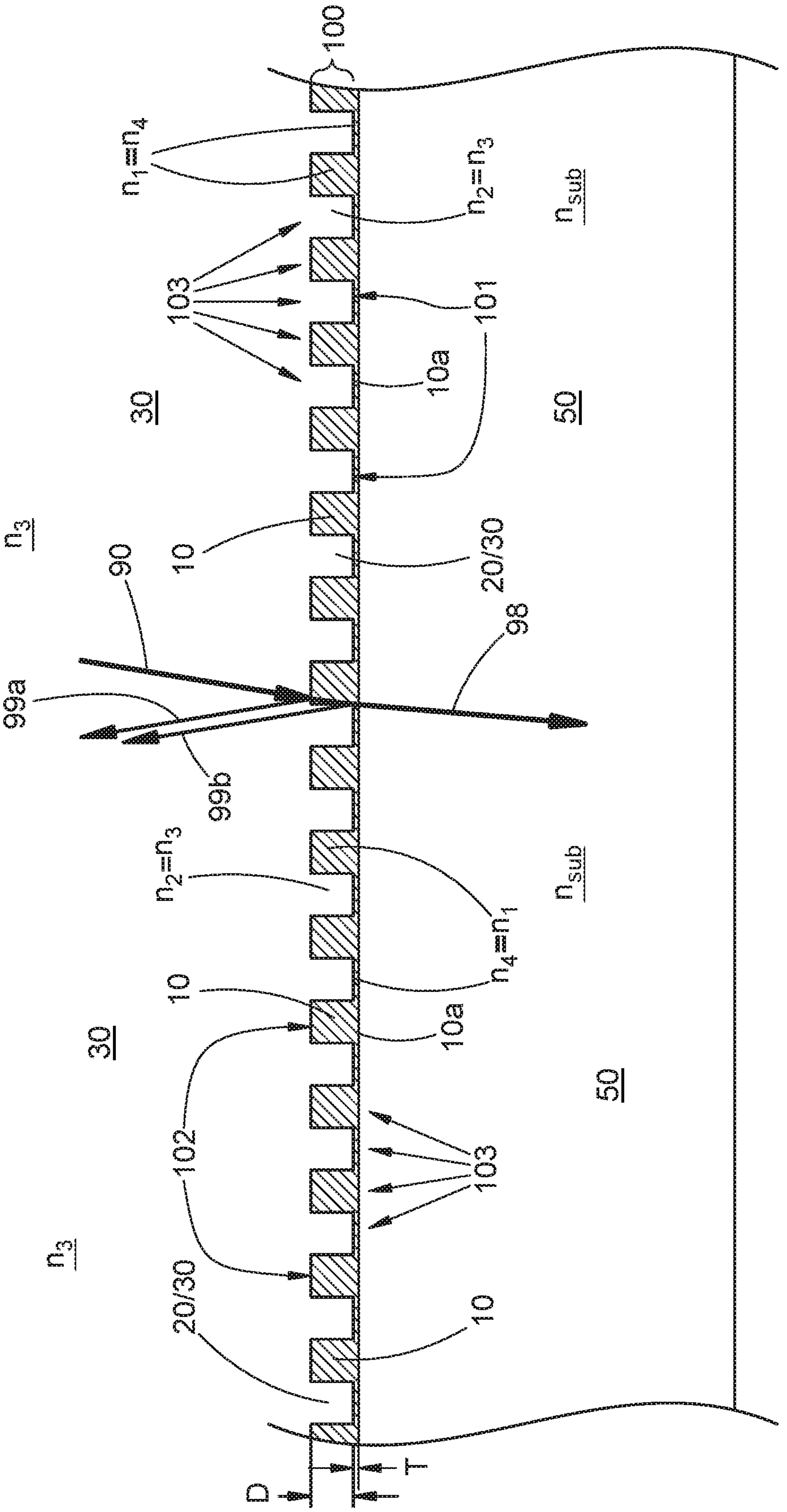
Figure 9:
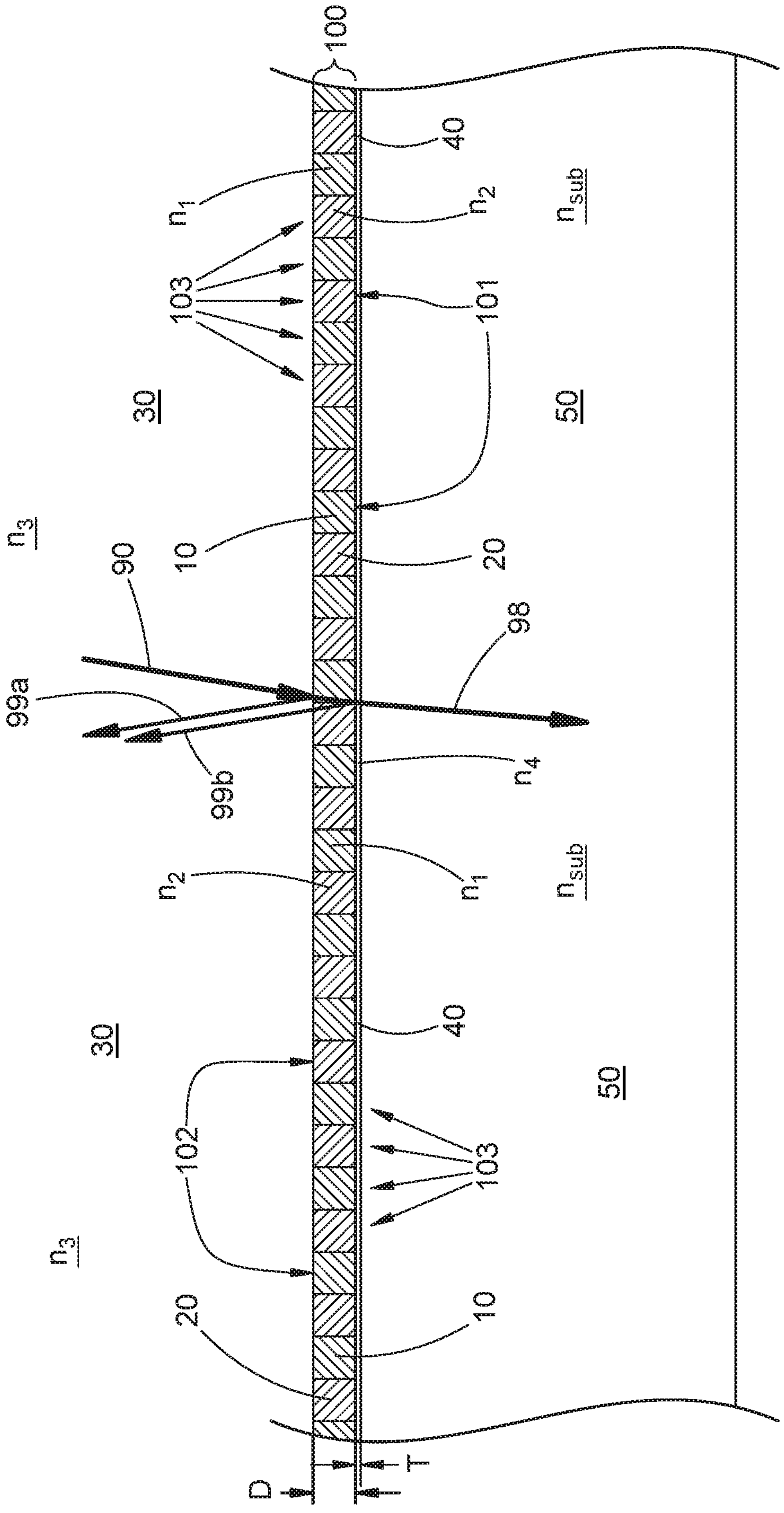
Figure 10:
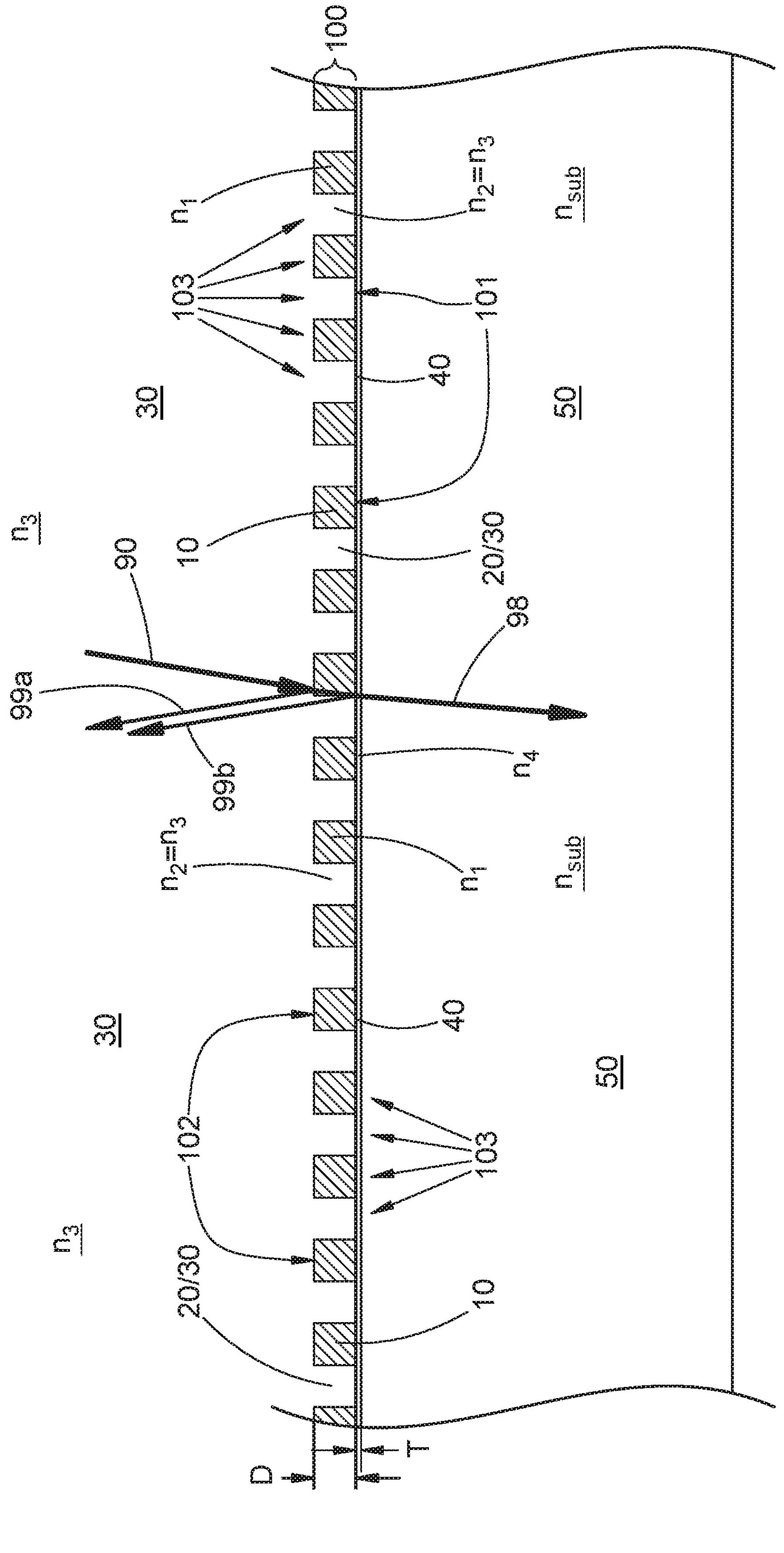
Figure 11:
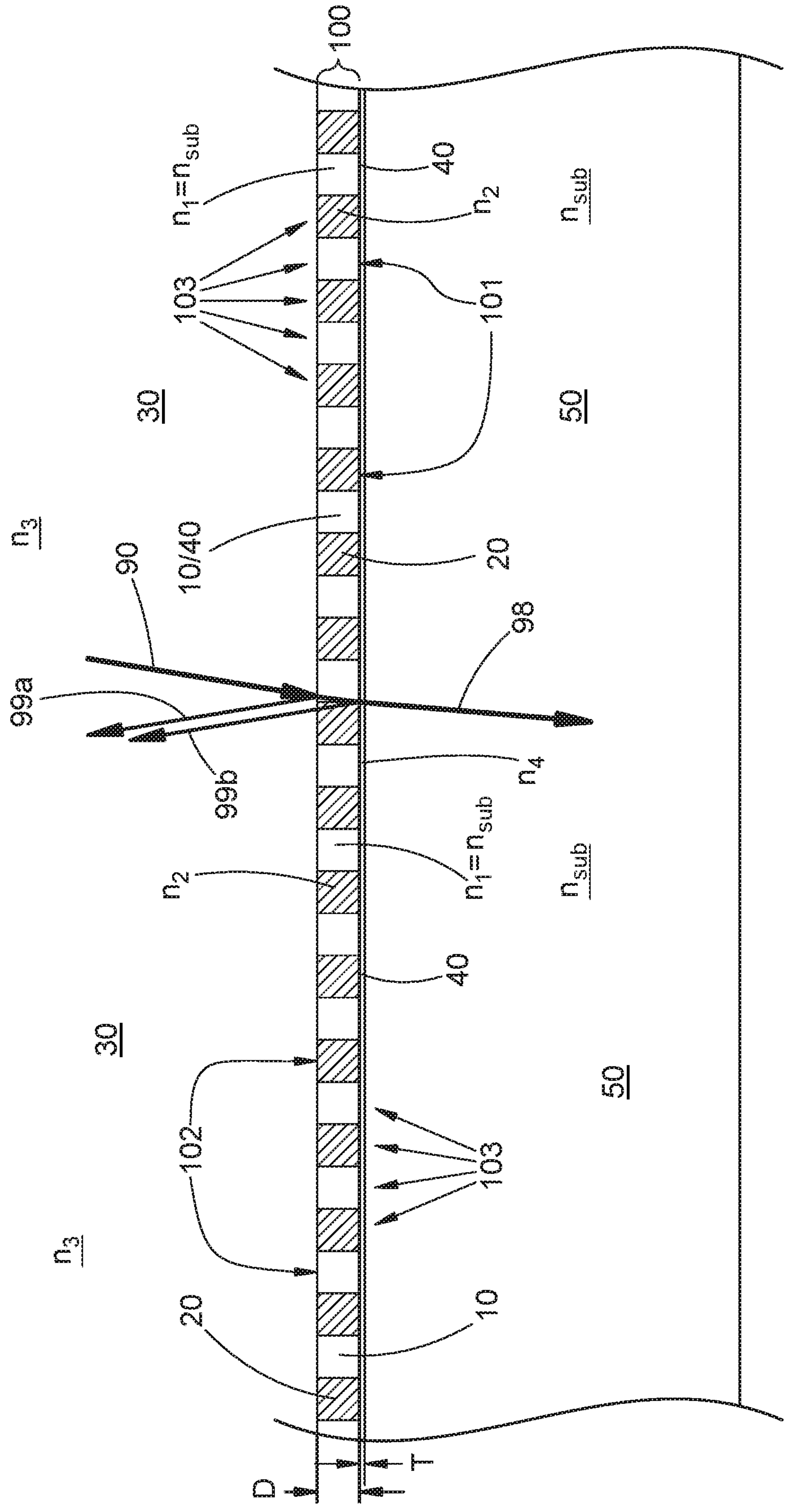
Figure 12:
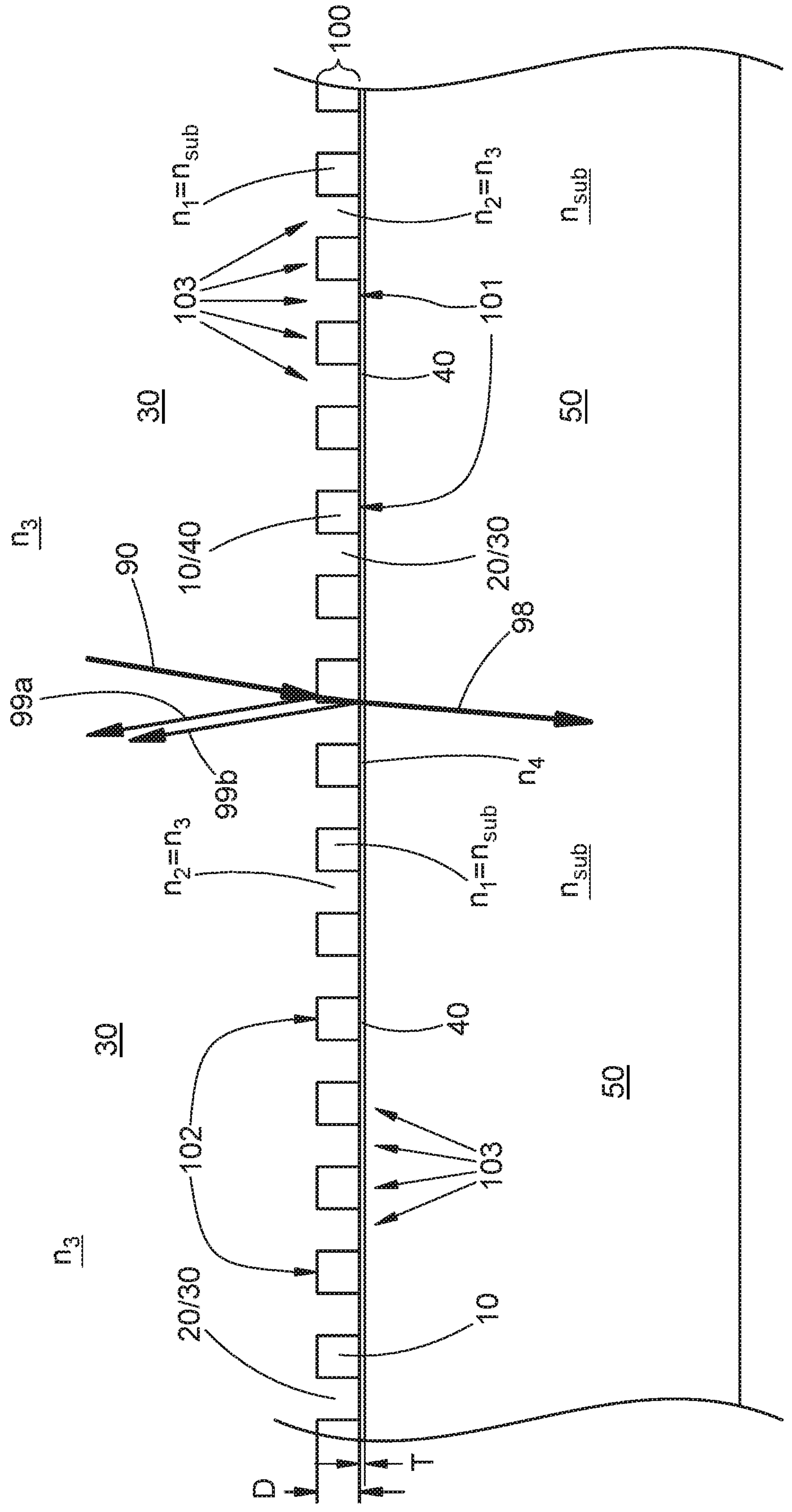

The example of FIGS. 7 and 8 are analogous to those of FIGS. 3 and 4, respectively, except that a layer 10*a* of thickness T of the first optical medium is positioned between the substrate 50 and the surface 101 of the transmissive layer 100. The layer 10*a* acts as the optical medium 40 described above, but with $n_1=n_4$. In such examples, a method for making the transmissive layer 100 comprises spatially selectively etching a layer of the optical medium 10 of thickness D+T to a depth of D (e.g., determined by etch rate and etch time) in selected volumes of the layer, and replacing in the selected volumes the optical medium 10 with the optical medium 20, thereby forming the transmissive layer 100 of the optical element.

In examples that include the optical medium 40 as an etch stop layer, a method for making the transmissive layer 100 comprises spatially selectively etching a layer of the optical medium 10 of thickness D to expose the optical medium 40 in selected volumes of the layer, and replacing in the selected volumes the optical medium 10 with the optical medium 20, thereby forming the transmissive layer 100 of an optical element.

In examples wherein the optical medium 10 exhibits a larger etch rate than the substrate 50, a method for making the transmissive layer 100 comprises spatially selectively etching a layer of the optical medium 10 of thickness D to expose the substrate 50 in selected volumes of the layer, and replacing in the selected volumes the optical medium 10 with the optical medium 20, thereby forming the transmissive layer 100 of an optical element.

More generally, a method for making the transmissive layer 100 comprises spatially selectively processing a layer of the optical medium 10 to replace, in selected volumes of the layer of depth D, the optical medium 10 with the optical medium 20, thereby forming the transmissive layer 100 of an optical element. The method can further include calibrating an arrangement of the variously sized and distributed discrete volumes 103 of the optical media 10 and 20 so that the net power reflectivity exhibited by the transmission layer 100 is about equal to a design net power reflectivity. The design net power reflectivity differs from the power reflectivity that would be exhibited by an interface between the substrate 50 and the optical medium 30 without the transmissive layer 100 therebetween. If the transmissive layer 100 is an anti-reflection layer, the calibration can yield exhibited net power reflectivity that is less than or about equal to the design power reflectivity.

An iterative process can be employed for fabricating a transmissive layer 100 with a specified design net power reflectivity. First, an intermediate optical element with an intermediate transmissive layer 100 is formed in any suitable way (including those described above), in accordance with an estimated arrangement of the discrete volumes 103 of the optical media 10 and 20. The net power reflectivity of the intermediate transmissive layer 100 is measured, and the estimated arrangement of the discrete volumes 103 of the optical media 10 and 20 is altered in accordance with a difference between the measured net power reflectivity and the specified design net power reflectivity. Those steps are repeated using successively altered estimated arrangements of the discrete volumes 103 of the optical media 10 and 20 until the measured net power reflectivity is about equal to the specified design net power reflectivity (or less, if an anti-reflection layer is being formed). The intermediate optical element that meets that criterion is the finished optical element. For an anti-reflection layer, an initial estimated arrangement of the discrete volumes 103 can be employed wherein:

$$f_1\cdot[(n_1-n_3)/(n_1+n_3)]+f_2\cdot[(n_2-n_3)/(n_2+n_3)]\approx f_1\cdot[(n_{sub}-n_1)/(n_{sub}+n_1)]+f_2\cdot[(n_{sub}-n_2)/(n_{sub}+n_2)];$$

and $$D\approx\lambda_0/[4\cdot(f_1\cdot n_1+f_2\cdot n_2)],$$

where $f_1$ and $f_2$ are fractional areas of the transmissive layer occupied by the first and second optical media, respectively, and $f_1+f_2\approx 1$. As noted above, the calculated values of $r_1$, $r_2$, and $\Delta\varphi$ are only estimated as a starting point for the optimization of the area fractions $f_1$ and $f_2$ and the thickness D. Optimization of the arrangement of the discrete volumes 103 (by altering the area fractions $f_1$ and $f_2$, the thickness D, or both) to reduce, minimize, or eliminate net power reflectivity from the transmission layer can yield final values for $f_1$, $f_2$, or D that can differ from the initial estimated values. In addition, the final optimized values for $f_1$ and $f_2$ can differ based on the nature of the geometry of the discrete volumes 103, e.g., volumes 103 arranged as grooves and ridges might exhibit minimal reflectivity at different fractional areas than an island/sea arrangement or a two-dimensional grid arrangement. It can be advantageous to perform multiple iterations simultaneously on distinct areas of a common substrate. In one example, the thickness D can vary in steps across a substrate wafer in one dimension, while the fraction areas $f_1$ and $f_2$ can vary in steps across a substrate wafer in the other dimension. After processing the wafer, reflectivity can be measured at different positions on the wafer corresponding to different combinations of D, $f_1$, and $f_2$ to find an optimal (or sufficiently near optimal) combination of those parameters that yields the lowest (or sufficiently low) net power reflectivity. Other suitable iterative optimization schemes can be employed. Note that optimal, or near optimal, values for the area fractions $f_1$ and $f_2$, the thickness D can be found even if one or more of the effective reflectivities $r_1$ and $r_2$ or the effective phase Ap are not well defined or measurable, and a transmissive layer 100 having such optimized structural parameters shall fall within the scope of the present disclosure or appended claims.

In the examples described above, the transmissive layer 100 acts as an anti-reflection layer due to destructive interference between reflections from the surfaces 101 and 102 of the transmissive layer 100. Instead, the transmissive layer 100 can be arranged so that net power reflectivity of the transmissive layer 100 is greater than power reflectivity that would be exhibited by an interface between the substrate 50 and the optical medium 30 without the transmissive layer 100 therebetween. That increased net power reflectivity arises from constructive interference between the reflections from the surfaces 101 and 102. In some examples, that constructive interference occurs when $r_1\cdot r_2>0$ and $\Delta\varphi\approx\pi$. In other examples, constructive interference occurs when $r_1\cdot r_2<0$ and $\Delta\varphi\approx\pi/2$.

In addition to the preceding, the following examples fall within the scope of the present disclosure or appended claims:

Example 1. An optical element comprising a transmissive layer comprising first and second optical media, wherein: (a) the transmissive layer has a substantially uniform thickness D, a first surface of the transmissive layer faces a solid substrate, the substrate supports the transmissive layer, a second surface of the transmissive layer is positioned against a third optical medium so that the transmissive layer is interposed between the substrate and the third optical medium, and the first optical medium comprises a solid material; (b) the first optical medium, the second optical medium, the third optical medium, and the substrate are substantially transparent over an operational wavelength range that includes a design vacuum wavelength $\lambda_0$, are characterized by respective bulk refractive indices $n_1$, $n_2$, $n_3$, and $n_{sub}$, and, over at least the operational wavelength range, $n_1\neq n_2$; (c) the first and second optical media are arranged within the transmissive layer as a contiguous multitude of discrete volumes, and each discrete volume (i) extends longitudinally from the first surface to the second surface, and (ii) comprises either the first optical medium or the second optical medium, but not both; (d) (i) each discrete volume of the first optical medium is less than a distance $d_1$ in transverse extent in one or both transverse dimensions and is separated from at least one other discrete volume of the first optical medium by a transverse distance less than $d_2$ through an intervening discrete volume of the second optical medium, and $d_1+d_2<2\lambda_0/(n_{sub}+n_3)$, or (ii) each discrete volume of the second optical medium is less than a distance $d_2$ in transverse extent in one or both transverse dimensions and is separated from at least one other discrete volume of the second optical medium by a transverse distance less than $d_1$ through an intervening discrete volume of the first optical medium, and $d_1+d_2<2\lambda_0/(n_{sub}+n_3)$; (e) the discrete volumes of the multitude are sized and distributed on the transmissive layer so that, for an optical signal within the operational wavelength range and incident on the transmissive layer, the optical element exhibits (i) field amplitude reflectivity $r_1$ from the first surface, (ii) phase delay $\Delta\varphi$ for single-pass propagation through the transmissive layer, and (iii) field amplitude reflectivity $r_2$ from the second surface, each of which is substantially constant, when averaged with a sampling area about equal in transverse extent to $\lambda_0$ in both transverse dimensions, as a function of two-dimensional transverse position along the transmissive layer; and (f) the substantially constant values of $r_1$, $\Delta\varphi$, and $r_2$ result in net power reflectivity of the transmissive layer that differs from power reflectivity that would be exhibited by an interface between the substrate and the third optical medium without the transmissive layer therebetween.

Example 2. The optical element of Example 1 further comprising the substrate.

Example 3. The optical element of any one of Examples 1 or 2 further comprising the third optical medium.

Example 4. The optical element of any one of Examples 1 through 3 wherein $d_1+d_2<\lambda_0/(n_{sub}+n_3)$.

Example 5. The optical element of any one of Examples 1 through 4 wherein, over at least the operational wavelength range, $n_{sub} \neq n_3$.

Example 6. The optical element of any one of Examples 1 through 5 wherein the substantially constant values of $r_1$, $\Delta\varphi$, and $r_2$ result in net power reflectivity of the transmissive layer that is less than power reflectivity that would be exhibited by an interface between the substrate and the third optical medium without the transmissive layer therebetween.

Example 7. The optical element of Example 6 wherein net power reflectivity of the transmissive layer is less than about one half of the power reflectivity that would be exhibited by an interface between the substrate and the third optical medium without the transmissive layer therebetween.

Example 8. The optical element of Example 6 wherein net power reflectivity of the transmissive layer is less than about one fourth of the power reflectivity that would be exhibited by an interface between the substrate and the third optical medium without the transmissive layer therebetween.

Example 9. The optical element of Example 6 wherein net power reflectivity of the transmissive layer is less than about one tenth of the power reflectivity that would be exhibited by an interface between the substrate and the third optical medium without the transmissive layer therebetween.

Example 10. The optical element of any one of Examples 1 through 5 wherein the substantially constant values of $r_1$, $\Delta\varphi$, and $r_2$ result in net power reflectivity of the transmissive layer that is greater than power reflectivity that would be exhibited by an interface between the substrate and the third optical medium without the transmissive layer therebetween.

Example 11. The optical element of any one of Examples 1 through 10 wherein the optical element is structurally arranged so as to receive the incident optical signal at substantially normal incidence.

Example 12. The optical element of any one of Examples 1 through 10 wherein the optical element is structurally arranged so as to receive the incident optical signal at non-normal incidence.

Example 13. The optical element of any one of Examples 1 through 12 wherein $n_1 = n_{sub}$.

Example 14. The optical element of Example 13 wherein the substrate and the first optical medium are the same solid material, and the transmissive layer comprises a surface relief structure formed on a surface of the substrate with the second optical medium substantially filling recessed regions of the surface relief structure.

Example 15. The optical element of any one of Examples 1 through 12 wherein $n_1 \neq n_{sub}$.

Example 16. The optical element of any one of Examples 1 through 13 or Example 15 wherein the substrate comprises material different from the first optical medium, the first surface of the transmission layer is positioned against the substrate, and the transmissive layer comprises a surface relief structure formed through a layer of the first optical medium on the substrate with the second optical medium substantially filling recessed regions of the surface relief structure.

Example 17. The optical element of Example 16 wherein the first optical medium exhibits an etch rate substantially larger than an etch rate of the substrate.

Example 18. The optical element of any one of Examples 1 through 17 wherein the first optical medium is electrically conductive.

Example 19. The optical element of any one of Examples 1 through 18 wherein $n_2 = n_3$.

Example 20. The optical element of Example 19 wherein the second and third optical media are the same solid material.

Example 21. The optical element of Example 19 wherein the second and third optical media are the same gaseous or liquid material or are both vacuum.

Example 22. The optical element of any one of Examples 1 through 18 wherein $n_2$; $n_3$.

Example 23. The optical element of any one of Examples 1 through 19 or Example 22 wherein the second and third optical media are different solid materials.

Example 24. The optical element of any one of Examples 1 through 19 or Example 22 wherein the second optical medium is a solid material and the third optical medium is a gaseous or liquid material or is vacuum.

Example 25. The optical element of any one of Examples 1 through 24 wherein (i) the discrete volumes of the multitude are arranged as a multitude of linear or curvilinear ridges of the first optical medium and intervening grooves filled with the second optical medium, (ii) widths of the ridges are less than $d_1$, (iii) widths of the grooves are less than about $d_2$, and (iv) $d_1+d_2<2\lambda_0/(n_{sub}+n_3)$.

Example 26. The optical element of Example 25 wherein (i) the discrete volumes of the multitude are arranged as a multitude of linear or curvilinear ridges of the first optical medium and intervening grooves filled with the second optical medium, (ii) widths of the ridges are less than $d_1$, (iii) widths of the grooves are less than about $d_2$, and (iv) $d_1+d_2<\lambda_0/(n_{sub}+n_3)$.

Example 27. The optical element of any one of Examples 1 through 24 wherein each discrete volume of the first optical medium is less than about $\lambda_0/(n_{sub}+n_3)$ in both transverse dimensions, or each discrete volume of the second optical medium is less than about $\lambda_0/(n_{sub}+n_3)$ in both transverse dimensions.

Example 28. The optical element of Example 27 wherein each discrete volume of the first optical medium is less than about $\lambda_0/(2(n_{sub}+n_3))$ in both transverse dimensions, or each discrete volume of the second optical medium is less than about $\lambda_0/(2(n_{sub}+n_3))$ in both transverse dimensions.

Example 29. The optical element of any one of Examples 1 through 24 or Examples 27 or 28 wherein the multitude of discrete volumes is arranged as (i) a multitude of simply connected volumes of the first optical medium surrounded by the second optical medium or (ii) a multitude of simply connected volumes of the second optical medium surrounded by the first optical medium.

Example 30. The optical element of any one of Examples 1 through 29 wherein the discrete volumes of the multitude are arranged along the transmissive layer with a periodicity Ao between about $\lambda_0/(50(n_{sub}+n_3))$ and about $2\lambda_0/(n_{sub}+n_3)$.

Example 31. The optical element of Example 30 wherein the discrete volumes of the multitude are arranged along the transmissive layer with a periodicity Ao between about $\lambda_0/(10(n_{sub}+n_3))$ and about $\lambda_0/(n_{sub}+n_3)$.

Example 32. The optical element of any one of Examples 1 through 29 wherein the discrete volumes are spatially distributed across the transmissive layer in an uncorrelated, irregular, random, or pseudo-random arrangement.

Example 33. The optical element of any one of Examples 1 through 32 wherein net power reflectivity of the transmissive layer is about equal to $|r_1+r_2\cdot\cos(2\cdot\Delta\varphi)|^2$.

Example 34. The optical element of Example 33 wherein $r_1\cdot r_2>0$ and $\Delta\varphi\approx\pi/2$, so that net power reflectivity of the transmissive layer that is less than power reflectivity that would be exhibited by an interface between the substrate and the third optical medium without the transmissive layer therebetween.

Example 35. The optical element of Example 34 wherein $r_1 \approx r_2$.

Example 36. The optical element of Example 33 wherein $r_1 \cdot r_2 < 0$ and $\Delta\varphi \approx \pi$, so that net power reflectivity of the transmissive layer that is less than power reflectivity that would be exhibited by an interface between the substrate and the third optical medium without the transmissive layer therebetween.

Example 37. The optical element of Example 36 wherein $r_1 \approx -r_2$.

Example 38. The optical element of Example 33 wherein $r_1 \cdot r_2 > 0$ and $\Delta\varphi \approx \pi$, so that net power reflectivity of the transmissive layer that is greater than power reflectivity that would be exhibited by an interface between the substrate and the third optical medium without the transmissive layer therebetween.

Example 39. The optical element of Example 33 wherein $r_1 \cdot r_2 < 0$ and $\Delta\varphi \approx \pi/2$, so that net power reflectivity of the transmissive layer that is greater than power reflectivity that would be exhibited by an interface between the substrate and the third optical medium without the transmissive layer therebetween.

Example 40. The optical element of any one of Examples 1 through 39 wherein, for an optical signal incident on the second surface of the transmissive layer at normal incidence, (i) $r_1 = f_1 \cdot [(n_1 - n_3)/(n_1 + n_3)] + f_2 \cdot [(n_2 - n_3)/(n_2 + n_3)]$ and (ii) $r_2 \approx f_1 \cdot [(n_{sub} - n_1)/(n_{sub} + n_1)] + f_2 \cdot [(n_{sub} - n_2)/(n_{sub} + n_2)]$, where $f_1$ and $f_2$ are fractional areas of the transmissive layer occupied by the first and second optical media, respectively, and $f_1 + f_2 \approx 1$.

Example 41. The optical element of any one of Examples 1 through 40 wherein, for an optical signal incident on the optical element at normal incidence, $\Delta\varphi \approx [f_1 \cdot n_1 + f_2 \cdot n_2] \cdot 2\pi D/\lambda_0$, where $f_1$ and $f_2$ are fractional areas of the transmissive layer occupied by the first and second optical media, respectively, and $f_1 + f_2 \approx 1$.

Example 42. The optical element of any one of Examples 1 through 41 wherein the substrate comprises one or more of: doped or undoped silicon; one or more doped or undoped III-V semiconductors; doped or undoped silicon oxide, nitride, or oxynitride; one or more doped or undoped metal oxides, nitrides, or oxynitrides; one or more optical glasses; or one or more doped or undoped polymers.

Example 43. The optical element of any one of Examples 1 through 42 wherein the first optical medium comprises one or more of: doped or undoped silicon; one or more doped or undoped III-V semiconductors; doped or undoped silicon oxide, nitride, or oxynitride; one or more doped or undoped metal oxides, nitrides, or oxynitrides; one or more optical glasses; one or more doped or undoped polymers; or indium tin oxide.

Example 44. The optical element of any one of Examples 1 through 43 wherein the second optical medium comprises one or more of: vacuum; one or more of air, nitrogen, noble gas, or other inert gas; one or more optical liquids; doped or undoped silicon; one or more doped or undoped III-V semiconductors; doped or undoped silicon oxide, nitride, or oxynitride; one or more doped or undoped metal oxides, nitrides, or oxynitrides; one or more optical glasses; or one or more doped or undoped polymers.

Example 45. The optical element of any one of Examples 1 through 44 wherein the third optical medium comprises one or more of: vacuum; one or more of air, nitrogen, noble gas, or other inert gas; one or more optical liquids; doped or undoped silicon; one or more doped or undoped III-V semiconductors; doped or undoped silicon oxide, nitride, or oxynitride; one or more doped or undoped metal oxides, nitrides, or oxynitrides; one or more optical glasses; or one or more doped or undoped polymers.

Example 46. The optical element of any one of Examples 1 through 45 wherein boundary surfaces between the first and second optical medium are substantially perpendicular to the first and second surfaces.

Example 47. The optical element of any one of Examples 1 through 45 wherein boundary surfaces between the first and second optical medium are within about 5° of perpendicular to the first and second surfaces.

Example 48. The optical element of any one of Examples 1 through 45 wherein boundary surfaces between the first and second optical medium are within about 10° of perpendicular to the first and second surfaces.

Example 49. The optical element of any one of Examples 1 through 45 wherein boundary surfaces between the first and second optical medium are within about 20° of perpendicular to the first and second surfaces.

Example 50. The optical element of any one of Examples 1 through 45 wherein boundary surfaces between the first and second optical medium are within about 30° of perpendicular to the first and second surfaces.

Example 51. The optical element of any one of Examples 1 through 45 wherein boundary surfaces between the first and second optical medium are within about 45° of perpendicular to the first and second surfaces.

Example 52. The optical element of any one of Examples 1 through 51 wherein the first surface of the transmission layer is positioned against the substrate.

Example 53. The optical element of any one of Examples 1 through 51 further comprising a layer of a fourth optical medium that separates the substrate from the first and second optical media, wherein the fourth optical medium is (i) a substantially solid material, (ii) substantially transparent over the operational wavelength range, (iii) characterized by a wavelength-dependent bulk refractive index $n_4$.

Example 54. The optical element of Example 53 wherein the first and fourth optical media are the same solid material so that $n_1 =_4$, the transmissive layer comprises a surface relief structure formed on a layer of the first optical medium on the substrate with the second optical medium substantially filling recessed regions of the surface relief structure, and the field amplitude reflectivity $r_2$ and the phase delay $\Delta\varphi$ result at least in part from a superposition of reflections from recessed regions of the surface relief structure and an interface between the first optical medium and the substrate.

Example 55. The optical element of Example 53 wherein the fourth optical medium comprises material different from the first optical medium, the transmissive layer comprises a surface relief structure formed through a layer of the first optical medium on the fourth optical medium with the second optical medium substantially filling recessed regions of the surface relief structure, and the field amplitude reflectivity $r_2$ and the phase delay $\Delta\varphi$ result at least in part from a superposition of reflections from recessed regions of the surface relief structure and an interface between the fourth optical medium and the substrate.

Example 56. The optical element of Example 55 wherein the first optical medium exhibits an etch rate substantially larger than an etch rate of the fourth optical medium.

Example 57. The optical element of any one of Examples 55 or 56 wherein the fourth optical medium comprises one or more of: doped or undoped silicon; one or more doped or undoped III-V semiconductors; doped or undoped silicon oxide, nitride, or oxynitride; one or more doped or undoped metal oxides, nitrides, or oxynitrides; one or more optical glasses; one or more doped or undoped polymers; titanium dioxide; or hafnium dioxide.

Example 58. A method for making the optical element of any one of Examples 55 through 57, the method comprising spatially selectively etching through a layer of the first optical medium to remove selected volumes of the layer of the first optical medium to expose the fourth optical medium, and replacing, in the selected volumes of the layer, the first optical medium with the second optical medium, thereby forming the transmissive layer of the optical element.

Example 59. A method for making the optical element of any one of Examples 16 or 17, the method comprising spatially selectively etching through a layer of the first optical medium to remove selected volumes of the layer of the first optical medium to expose the substrate, and replacing, in the selected volumes of the layer, the first optical medium with the second optical medium, thereby forming the transmissive layer of the optical element.

Example 60. A method for making the optical element of any one of Examples 1 through 57, the method comprising spatially selectively processing a layer of the first optical medium to replace, in selected volumes of the layer, the first optical medium with the second optical medium, thereby forming the transmissive layer of the optical element.

Example 61. The method of any one of Examples 58 through 60 further comprising calibrating an arrangement of the variously sized and distributed discrete volumes of the multitude so that the net power reflectivity exhibited by the transmission layer is less than or about equal to a design net power reflectivity that is in turn less than the power reflectivity that would be exhibited by an interface between the substrate and the third optical medium without the transmissive layer therebetween.

Example 62. The method of any one of Examples 58 through 61, the method comprising: (A) specifying a design net power reflectivity of the transmissive layer; (B) forming an intermediate optical element having an intermediate transmissive layer by spatially selectively processing a layer comprising the first optical medium to replace, in selected volumes of the layer, the first optical medium with the second optical medium, in accordance with an estimated arrangement of the discrete volumes of the multitude; (C) measuring an intermediate net power reflectivity of the intermediate transmissive layer of the intermediate optical element; (D) altering the estimated arrangement of the discrete volumes of the multitude in accordance with a difference between the measured net power reflectivity and the specified design net power reflectivity; and (E) repeating steps (B), (C), and (D) using altered estimated arrangements of the discrete volumes of the multitude until the measured net power reflectivity is less than or about equal to the specified design net power reflectivity, (F) wherein the optical element is the intermediate optical element having the measured net power reflectivity that is less than or about equal to the specified design net power reflectivity.

Example 63. The method of Example 62 wherein, for an initial estimated arrangement of the discrete volumes of the multitude:

(i) $f_1\cdot[(n_1-n_3)/(n_1+n_3)]+f_2\cdot[(n_2-n_3)/(n_2+n_3)]f_1\cdot[(n_{sub}-n_1)/(n_{sub}+n_1)]+f_2\cdot[(n_{sub}-n_2)/(n_{sub}+n_2)]$; and (ii) $D\approx\lambda_0/[4\cdot(f_1\cdot n_1+f_2\cdot n_2)]$, (iii) where $f_1$ and $f_2$ are fractional areas of the transmissive layer occupied by the first and second optical media, respectively, and $f_1+f_2\approx 1$.

Example 64. The method of any one of Examples 62 or 63 wherein steps (B), (C), and (D) are performed for multiple different estimated arrangements of the discrete volumes simultaneously on multiple corresponding distinct areas of a common substrate.

Example 65. The method of any one of Examples 62 through 64 wherein step (D) includes (i) altering the thickness D of the transmissive layer, (ii) altering $f_1$ and $f_2$, where $f_1$ and $f_2$ are fractional areas of the transmissive layer occupied by the first and second optical media, respectively, and $f_1+f_2\approx 1$, or (iii) altering D, $f_1$, and $f_2$.

Example 66. A method for using the optical element of any one of Examples 1 through 57, the method comprising directing an optical signal onto the transmissive layer of the optical element and transmitting through the transmissive layer at least a portion of the incident optical signal.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets or combinations of features that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, any labelling of elements, steps, limitations, or other portions of a claim (e.g., first, second, etc., (a), (b), (c), etc., or (i), (ii), (iii), etc.) is only for purposes of clarity, and shall not be construed as implying any sort of ordering or precedence of the claim portions so labelled. If any such ordering or precedence is intended, it will be explicitly recited in the claim or, in some instances, it will be implicit or inherent based on the specific content of the claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A method for making an optical element to modify a reflection of an optical signal having an operational wavelength $\lambda_0$, the method comprising:

(A) specifying a design net power reflectivity of a transmissive layer;

(B) forming an intermediate optical element supported by a substrate, the intermediate optical element having an intermediate transmissive layer by spatially selectively processing a layer comprising a first optical medium to replace, in selected volumes of the layer, the first optical medium with the second optical medium, in accordance with an estimated arrangement of discrete volumes to form a contiguous multitude of the discrete volumes, wherein a first surface of the intermediate transmissive layer faces the substrate, and a second surface of the transmissive layer is positioned against a third optical medium, wherein each discrete volume (i) extends longitudinally from the first surface to the second surface, and (ii) comprises either the first optical medium or the second optical medium, but not both;

(C) measuring an intermediate net power reflectivity of the intermediate transmissive layer of the intermediate optical element;

(D) altering the estimated arrangement of the discrete volumes of the multitude in accordance with a difference between the measured net power reflectivity and the specified design net power reflectivity; and (E) forming at least one additional intermediate optical element by repeating steps (B) and (C), using the altered estimated arrangements of the discrete volumes of the multitude until the measured net power reflectivity of the at least one additional intermediate optical element is less than or about equal to the specified design net power reflectivity, (F) wherein the optical element is the at least one additional intermediate optical element having the measured net power reflectivity that is less than or about equal to the specified design net power reflectivity wherein, for an initial estimated arrangement of the discrete volumes of the multitude the following conditions are satisfied:

$$f1\left[\frac{n1(\lambda_0)-n3(\lambda_0)}{n1(\lambda_0)+n3(\lambda_0)}\right]+f2\left[\frac{n2(\lambda_0)-n3(\lambda_0)}{n2(\lambda_0)+n3(\lambda_0)}\right]\approx f1\left[\frac{(nsub(\lambda_0)-n1(\lambda_0))}{(nsub(\lambda_0)+n1(\lambda_0))}\right]+f2\left[\frac{nsub(\lambda_0)-n2(\lambda_0)}{nsub(\lambda_0)+n2(\lambda_0)}\right]; \quad \text{(i)}$$

(ii) $D\approx\lambda_0/[4(f_1\cdot n_1(\lambda_0)+f_2\cdot n_2(\lambda_0))]$, (iii) where $f_1$ and $f_2$ are fractional areas of the transmissive layer occupied by the first and second optical media, respectively, $f_1+f_2\approx1$, wherein $n_1(\lambda_0)$, $n_2(\lambda_0)$, $n_3(\lambda_0)$) and $n_{sub}(\lambda_0)$ are, respectively, the bulk refractive indices of the first optical medium, the second optical medium, the third optical medium and the substrate at the operational wavelength, and the transmissive layer has as substantially uniform thickness D.

2. The method of claim 1 further comprising calibrating an arrangement of the variously sized and distributed discrete volumes of the multitude so that the net power reflectivity exhibited by the transmission layer is less than or about equal to a design net power reflectivity that is in turn less than the power reflectivity that would be exhibited by an interface between a substrate and the third optical medium without the transmissive layer therebetween.

3. The method of claim 1 further comprising performing step (B) multiple times to form a plurality of intermediate optical elements for multiple different estimated arrangements of the discrete volumes simultaneously on multiple corresponding distinct areas of a common substrate.

4. The method of claim 1 wherein step (D) includes (i) altering the thickness D of the transmissive layer, (ii) altering $f_1$ and $f_2$, where $f_1$ and $f_2$ are fractional areas of the transmissive layer occupied by the first and second optical media, respectively, and $f_1+f_2\approx1$, or (iii) altering $D, f_1$, and $f_2$.

5. The method of claim 1, wherein step (B) ("forming an intermediate optical element") further comprises:

providing the third optical medium such that it is configured to be substantially transparent to the operational wavelength $\lambda_0$ and having a bulk refractive index at the operational wavelength of $n_3(\lambda_0)$;

wherein the substrate is substantially transparent to the operational wavelength $\lambda_0$ and has a bulk refractive index at the operational wavelength of $n_{sub}(\lambda_0)$, wherein the transmissive layer has a substantially uniform thickness D, whereby the transmissive layer is interposed between the substrate and the third optical medium;

wherein each discrete volume of the first optical medium is less than a first distance $d_1$ in transverse extent in one or both transverse dimensions and is separated from at least one other discrete volume of the first optical medium by a transverse distance less than a second distance $d_2$ through an intervening discrete volume of the second optical medium, and a relationship of the first and second distances $d_1$ and $d_2$ is defined as a sum of the first and second distances $(d_1+d_2)$ being less than a ratio of the operational wavelength $\lambda_0$, to which the first, second, and third optical media and the solid substrate are configured to be substantially transparent, relative to a sum of the bulk refractive indices at the operational wavelength for the solid substrate and the third optical medium $(n_{sub}(\lambda_0)+n_3(\lambda_0))$, whereby $$d1 + d2 < \frac{\lambda_0}{nsub(\lambda_0) + n3(\lambda_0)},$$

or (ii) each discrete volume of the second optical medium is less than a second distance $d_2$ in transverse extent in one or both transverse dimensions and is separated from at least one other discrete volume of the second optical medium by a transverse distance less than a first distance $d_1$ through an intervening discrete volume of the first optical medium, and a relationship of the first and second distances $d_1$ and $d_2$ is defined as a sum of the first and second distances $(d_1+d_2)$ being less than a ratio of the operational wavelength $\lambda_0$, to which the first, second, and third optical media and the solid substrate are configured to be substantially transparent, relative to a sum of the bulk refractive indices at the operational wavelength for the solid substrate and the third optical medium $(n_{sub}(\lambda_0)+n_3(\lambda_0))$, whereby $$d1 + d2 < \frac{\lambda o}{nsub(\lambda_0) + n3(\lambda_0)};$$

the discrete volumes of the multitude are sized and distributed on the transmissive layer so that, for the optical signal within the operational wavelength $\lambda_0$ and incident on the transmissive layer, the optical element exhibits (i) a first field amplitude reflectivity $r_1$ from the first surface, (ii) a phase delay $\Delta\varphi$ for single-pass propagation through the transmissive layer, and (iii) a second field amplitude reflectivity $r_2$ from the second surface, each of which is substantially constant and non-zero, when averaged with a sampling area about equal in transverse extent to the operational wavelength $\lambda_0$ in both transverse dimensions, as a function of two-dimensional transverse position along the transmissive layer; and the substantially constant values of $r_1$, $\Delta\varphi$, and $r_2$ result in a net power reflectivity of the transmissive layer that differs from a power reflectivity exhibited by an interface between the substrate and the third optical medium without the transmissive layer therebetween.

6. The method of claim 1, further comprising propagating the optical signal to the optical element.

7. The method of claim 6 wherein, over at least the operational wavelength range, $n_{sub}(\lambda_0)\approx n_3(\lambda_0)$, and the substantially constant values of $r_1$, $\Delta\varphi$, and $r_2$ result in net power reflectivity of the transmissive layer that is less than power reflectivity that would be exhibited by an interface between the substrate and the third optical medium without the transmissive layer therebetween.

8. The method of claim 7 wherein a net power reflectivity of the transmissive layer is less than about one fourth of the power reflectivity that would be exhibited by the interface between the substrate and the third optical medium without the transmissive layer therebetween.

9. The method of claim 6 wherein the optical element is structurally arranged so as to receive the optical signal at non-normal incidence or at substantially normal incidence.

* * * * *